United States Patent
Kurz

(10) Patent No.: US 9,448,995 B2
(45) Date of Patent: Sep. 20, 2016

(54) METHOD AND DEVICE FOR PERFORMING NATURAL LANGUAGE SEARCHES

(71) Applicant: Nadine Sina Kurz, Stuttgart (DE)

(72) Inventor: Nadine Sina Kurz, Stuttgart (DE)

( * ) Notice: Subject to any disclaimer, the term of this patent is extended or adjusted under 35 U.S.C. 154(b) by 328 days.

(21) Appl. No.: 14/176,067

(22) Filed: Feb. 8, 2014

(65) Prior Publication Data

US 2014/0236579 A1    Aug. 21, 2014

(30) Foreign Application Priority Data

Feb. 18, 2013  (DE) .................. 10 2013 003 055

(51) Int. Cl.
| G06F 17/28 | (2006.01) |
| --- | --- |
| G06F 17/27 | (2006.01) |
| G06F 17/30 | (2006.01) |

(52) U.S. Cl.
CPC ............ *G06F 17/28* (2013.01); *G06F 17/277* (2013.01); *G06F 17/30684* (2013.01)

(58) Field of Classification Search
CPC ........... G06F 17/277; G06F 17/30684; G06F 17/2705; G06F 17/271; G06F 17/2715; G06F 17/28; G10L 15/1815; G10L 15/1822; G10L 15/183; G10L 15/19; G10L 15/197
USPC ............... 704/9; 707/708, 755, 771
See application file for complete search history.

(56) References Cited

U.S. PATENT DOCUMENTS

| 5,146,406 A | 9/1992 | Jensen | |
| --- | --- | --- | --- |
| 5,930,746 A | 7/1999 | Ting | |
| 5,963,940 A * | 10/1999 | Liddy | ............... G06F 17/30654 |
| 6,026,388 A * | 2/2000 | Liddy | ............... G06F 17/30654 |
| 6,311,194 B1 | 10/2001 | Sheth et al. | |
| 7,027,974 B1 | 4/2006 | Busch et al. | |
| 7,412,440 B2 | 8/2008 | Mori et al. | |
| 7,676,489 B2 | 3/2010 | Kaiser | |
| 7,949,676 B2 | 5/2011 | Mori et al. | |
| 8,301,438 B2 | 10/2012 | Ferrucci et al. | |
| 8,315,998 B1 | 11/2012 | Dean | |
| 8,762,130 B1 * | 6/2014 | Diaconescu | ............ G06F 17/27 704/10 |
| 2003/0167266 A1 * | 9/2003 | Saldanha | ............ G06F 17/2229 |
| 2004/0078190 A1 * | 4/2004 | Fass | ................ G06F 17/241 704/7 |
| 2005/0027512 A1 * | 2/2005 | Waise | ................ G06F 17/2715 704/9 |
| 2006/0206474 A1 * | 9/2006 | Kapur | ............... G06F 17/30864 |
| 2008/0091408 A1 * | 4/2008 | Roulland | .......... G06F 17/30672 704/9 |
| 2009/0222407 A1 * | 9/2009 | Takuma | ........... G06F 17/30684 |
| 2010/0211379 A1 * | 8/2010 | Gorman | ............. G06F 17/2785 704/9 |
| 2013/0268260 A1 * | 10/2013 | Lundberg | ............... G06F 17/28 704/8 |
| 2014/0163962 A1 * | 6/2014 | Castelli | .............. G06F 17/2715 704/9 |
| 2014/0188862 A1 * | 7/2014 | Campbell | ......... G06F 17/30554 707/728 |
| 2014/0188935 A1 * | 7/2014 | Vee | ..................... G06F 17/3043 707/771 |
| 2015/0205858 A1 * | 7/2015 | Xie | ........................ G06Q 50/01 707/755 |

* cited by examiner

*Primary Examiner* — John Villecco

(57) ABSTRACT

A digital device and a method for parsing a query, in particular a natural language query, and retrieving results from possibly multiple data sources such as relational databases or the Semantic Web. The method includes a parsing procedure for generating a graph-based logical representation of the query using semantically structured resources, consisting of a tokenizer, a node generator, a relationship generator, and a focus identificator. The digital device realizes a modularized architecture, consisting of a parser enabling the processing of a query with possibly multiple vocabularies, a query performer retrieving data of knowledge sources independently from their database management system, and a result processor merging the results.

6 Claims, 19 Drawing Sheets

METHOD AND DEVICE FOR PERFORMING NATURAL LANGUAGE SEARCHES

BACKGROUND OF THE INVENTION

This invention relates to a digital device, a method and a computer program according to the appended claims. More specifically, the invention relates to the field of performing searches, particularly natural language searches, on structured data, such as relational databases or the Semantic Web.

The World Wide Web (WWW) stores and administers information on the Internet in an essentially unstructured way. In order to overcome this deficiency, increasing efforts aim at structuring or classifying the information on the Internet. These efforts are run by the World Wide Web Consortium (W3C), see http://www.w3.org/, a major standard setting body for the World Wide Web. The aim of these efforts is to create a Semantic Web of (linked) data in which data is structured and queried using a common data model, see http://www.w3.org/standards/semanticweb/. One approach of a descriptive structured data model is presented by the Resource Description Framework (RDF)—http://w3.org/TR/2004/REC-rdf-concepts-20040210/—, which realizes information statements in the form of subject/predicate/object triples made about instances of specific classes. A common way of identifying resources on the Semantic Web is the employment of Uniform Resource Identifiers (URIs). A query language for RDF data has been presented with SPARQL (http://w3.org/TR/2008/REC-rdf-sparql-query-20080115/), which introduced the concept of pattern matching of graphs.

The increasing amount of structured data available on the Web increases the necessity to bridge the gap between informal natural language of human users and the formal query languages of structured databases. Natural Language Interfaces (NLIs) provide a solution for shifting the task of parsing a natural language query, generating an appropriate database query and processing the results to a machine in an automated way.

Increasing attention is paid to the issue of portability, i.e. the flexibility of NLIs with respect to its vocabularies which are employed to parse a query into a logical representation, and its knowledge sources, which represent the data corpus for retrieving search results. In this context, a promising approach is the emergence of NLIs retrieving data from multiple knowledge sources providing a variety of possible domains. Ideally, a distributed NLI would recognize what the query searches for and contact one or multiple appropriate knowledge sources in order to retrieve an answer. Furthermore, it would be preferable to employ knowledge sources for a NLI independently from their underlying database management systems.

BACKGROUND ART

In general, natural language interfaces (NLIs) incorporate with three stages: a) The parsing of a natural language query, b) the knowledge retrieval of various data sources, and c) the aggregation of the distributed results to a search response.

Considering the parsing of a natural language input, the purpose of syntactical parsing is the analysis of a natural language sentence and the generation of an intermediate representation depicting the natural language's semantics in a logical form able to be processed further by subsequent system components. Existing approaches can generally be divided into approaches performing a detailed linguistic analysis based on a formal grammar theory (referred to as Deep Parsing), and rather fast, lightweight approaches focusing on solving a particular task (Shallow Parsing).

Grammar-based parsers employ a set of rules to identify a sentence's structure and to generate a logical representation in the form of a parse tree. One of the main advantages of grammar-based systems is the high accuracy of the parsing process. On the other hand, the construction of a set of grammar rules is often a time-consuming task, while the systems may parse a query incorrectly if it is not formulated correctly according to the linguistic rules.

Shallow parsing methods, on the other hand, are rather focused on segmenting a sentence into logical units and to determine their semantic roles in the context of the sentence. Among the main approaches for shallow parsing are Part-Of-Speech (POS) Tagging, Text Chunking, Named Entity Recognition and/or Semantic Role Labeling.

Considering the process of retrieving search results from a knowledge base, existing approaches can be distinguished by their underlying database management systems, such as relational databases or RDF repositories. Examples of these and other prior attempts to build natural language search engines are e.g. disclosed in U.S. Pat. Nos. 8,315,998; 8,301,438(wherein this document describes the search for a named entity in the natural language question); DE 10 2007 000 954 A1 and DE 10 2009 037 848 A1. An early approach for setting up a database of metadata for a Semantic Web (specifically for capturing digital media content) is disclosed in U.S. Pat. No. 6,311,194 B1. Among the non-patent literature, reference is made to V. Tablan et al., A natural language query interface to structured information, ftp://www.dlsi.ua.es/people/antonio/A%20natural%20language%20query%20interface%20to%20structured%20information.pdf; Chong Wang et al., PANTO: A Portable Natural Language Interface to Ontologies, http://gate.ac.uk/sale/dd/related-work/2007+Wang+PANTO.pdf; and Ana-Maria Popescu et al., Modern Natural Language Interfaces to Databases: Composing Statistical Parsing with Semantic Tractability, http://acl.ldc.upenn.edu/coling2004/MAIN/pdf/21-783.pdf. In addition, a review of existing NLI's to databases is contained in I. Androutsopoulos et al., Natural Language Interfaces to Databases—An Introduction, http://acl.ldc.upenn.edu/coling2004/MAIN/pdf/21-783.pdf.

SUMMARY OF THE INVENTION

The present invention provides a digital device and a method for performing a search—in particular, but not limited to a natural language search—in semantically structured resources, such as relational databases or RDF repositories, by using a different approach than prior art solutions. In particular, it is an object of the present invention to provide a novel solution that reduces the amount of network resources and the processing time required to generate a meaningful response to the query. This object has, in general, various aspects:

a) By providing a better tailored response to the search question, a result can be obtained in less search steps, ideally only one search step;
b) Providing only few (or even only one) exact responses, rather than a long list of possible responses;
c) The more focused response thus saves processor and transmission time, as well as network time;
d) Employing a fast, fault-tolerant parsing mechanism generating a precise representation of the requested information;
e) Providing a modularized system architecture that is both independent in terms of the underlying vocabularies for parsing a query as well as the system's knowledge sources for retrieving search results.

From a technical perspective, a major object of the invention is to reduce the amount of processing, computer and network time required to perform a search. For example, it is an object of this invention to reduce the amount of processor time used to perform and/or conclude a search, so that the processor is either made available for other jobs, and/or can process more searches or queries in a given time, or that less powerful processors or computers can be used to perform the search.

Another technical object of the invention is to reduce the amount of storage, and/or other hardware, required to produce a meaningful search result.

The invention also aims at sending different commands and queries to the various components of a computer system and/or a distributed network to have them work in a novel way, i.e., the transmitted signals are different from prior solutions. Also, different control signals may be employed.

Furthermore, it is a technical object of the invention to reduce the number of network resources used on a distributed network and thus reduce the amount of network traffic; and in a client/server configuration, to enable communication from a "small" client with limited transmission speed, such as a mobile phone.

With respect to the user perspective, the invention aims at making the search process as simple as possible, in particular by offering the user an easy input method such as a text form in which the user can enter a natural language query as a simple sentence or question; providing a query result as fast as possible, while the search results are retrieved with high precision and thus save the user further time. It is also desirable to have as few responses are reasonably possible, rather than a long list of "hits".

From the perspective of the manufacturer of a search engine, the invention aims at making the development easy and possible at low cost.

The presented method is aimed at providing a faster and more fault-tolerant procedure than prior art solutions.

The present invention aims at solving one or more of the above objects (it is understood that, although ideally the invention may solve all of the above objects, also the solution of one of these objects, a partial solution of one or more objects etc. is within the scope of the invention).

In more specific terms, the invention provides a distributed natural language search engine using graph-based parsing (although its application is broader, as will become apparent throughout this description). One of its main features is the provision of a new parser, and the components thereof. Also, it is easier adaptable to new requirements through a novel approach of separating the access to ontologies and semantic resources, as will be discussed below.

Focusing first on one method aspect of the present invention, the invention relates to a computer-implemented method, or a method implemented using digital electronic components such as digital gates and application-specific integrated circuits, for retrieving results in response to a query. The query is preferably a user-defined natural language query, but could as well be a machine-generated query. It makes use of semantically structured resources stored in at least one database. The database can be stored locally as well as on a network such as the Internet, and in a preferred embodiment, the method according to the invention uses multiple databases and discriminates between them.

The method according to the invention includes the following steps:

i. tokenizing the query by segmenting the query into terms, in particular one or multiple words, and mapping them into semantic tokens using at least one lexicon, wherein such lexicon contains at least the token type of a semantic token, in particular class, role, instance and/or constraint ii. generating a representation, preferably a representation incorporating a mathematical graph, from the semantic tokens associated with the segmentation performed in step (i), that expresses the query in terms of a graph where nodes represent resources and edges represent relations between those nodes, by employing a set of modification rules, wherein the rules define one or more nodes, and/or one or more relationships between nodes, associated with the semantic tokens, and the rules distinguish between terminal and non-terminal nodes and relationships, and characterize one of the non-terminal nodes or relationships as the graph's focus, iii. generating a database query, for example in SQL, SPARQL or XQuery, from the graph-based intermediate query representation determined in step ii) and sending it to the at least one database, iv. retrieving a response from the at least one database.

Step i. serves to identify semantic tokens—i.e., objects with semantic descriptors—in the natural language query. A semantic token is characterized by its token type, which represents the semantic role of the token. The semantic role of a token is defined in terms of a conceptual data model similar to the one realized by ontologies on the Semantic Web, dividing knowledge into terminological knowledge, which defines the conceptual data of a defined domain as a set of classes and properties, and assertional knowledge, describing facts of instances of those classes. In fact, the two terms "token type" and "semantic role" are interchangeable, and although "token type" is used throughout this description, one could also say "semantic role". Typical token types $\pi$ of the invention are:

class (c)

role (r), often also called relationship, attribute or property, instance (i), sometimes also called resource, and constraint (ct), often also called query constraint or restriction such that $\pi$ [c, r, i, ct].

In the context of this invention, a token can be described as a quadruple $t_i$ (term identifier), $\pi$ (token type, as explained above), u (a uniform identifier, preferably a Uniform Resource Identifier) and r (relevance), but other definitions are of course possible.

In order to obtain tokens, the input query has first to be segmented into terms. A term can be a single word, or a combination of words, of the query, referring to a semantic entity. For example, the query "Towns in Sweden" can be segmented into the terms "Towns", "in", and Sweden"; or "Towns in" and "Sweden"; or "Towns" and "in Sweden"; or "Towns in Sweden".

Consequently, 4 possible segmentations of the initial query are possible. Each individual segmentation is also called a "term sequence", so that we have 4 possible term sequences in this example.

The segmentation of the query into term sequences can be done in various manners. A particularly advantageous way of segmentation will be described below; however, other methods are possible. By way of example, a preprocessor could remove the stopword "in" in the above query, so that only two possible segmentations remain:

"Towns", "Sweden"; or

"Towns Sweden"

which makes the segmentation easy to perform.

A preferred aspect of the present invention is a segmentation optimizer, which is part of the tokenizer and generates various different segmentations of the query, calculates the probability of each segmentation, preferably based on a relevance factor for a semantic token, and selects the most appropriate segmentation. Advantageously, the probability calculation is being done by a probability calculator using relevance factors for a semantic token from at least one lexicon, wherein the probability calculator computes the probability of each segmentation, and chooses a segmentation with a high probability, preferably the segmentation with the highest probability.

The term sequences determined in this way are then mapped into the semantic tokens mentioned previously. According to the invention, a lexicon is used for this purpose, containing mappings between terms and semantic tokens. Each term in a term sequence is sent to or looked up in the lexicon, which returns a token (provided it exists) together with its token type. In the last example above, the lexicon would return that "town" is a class and that "sweden" is an instance, but it would return a zero result for "town sweden".

The lexicon may be kept locally or on a network such as the Internet. The term associations contained in a lexicon are preferably extracted from ontologies such as DBpedia (http://www.dbpedia.org), which provide a conceptual world model by their underlying ontology as well as an instance set in the form of the set of articles, discussed in the detailed description. Preferably, the lexicon is however kept locally, optimizing the processing time of an actual query. This has three advantages: The processing time of an actual query is reduced since no network traffic is required; a local lexicon can be better tailored to the needs of a search engine; and lexicons can easily be added or removed thus making the system much more flexible.

Also, in a preferred embodiment of the invention, the lexicon returns not only the semantic role of a token, but also a resource identifier such as a Uniform Resource Identifier pointing to a particular resource on the network that contains, or may contain, information about the token; and in an even more preferred embodiment, it computes the token that is considered most relevant for the given term, and returns a relevance factor or relevance indicator indicating the probability with which the term matches the token. The advantages of both approaches will be discussed in more detail below.

This process of transforming, or mapping, a term sequence into semantic tokens by means of segmentation and lexicon look-up is appropriately called "tokenization", and a machine performing the process is called a "tokenizer". The tokenizer can be a separate digital machine or, more appropriately, a virtual machine running on a digital computer wherein the instructions for the machine for performing the tokenization process are stored in a tokenizer memory.

One preferred method according to the invention includes the following steps for tokenizing the query:

a) segmenting the query into terms, in particular one or multiple words, b) mapping the terms into semantic tokens using at least one lexicon, wherein such lexicon contains at least the token type of a token, in particular class, role, instance and/or constraint, c) calculating the probability that such segmentation is appropriate, d) repeating steps a) to c) at least one more time for a different segmentation, e) comparing the probabilities of different segmentations and selecting a segmentation with a high probability, in particular the segmentation with the highest probability, f) performing the step of generating a graph-based representation based on the selected segmentation.

This preferred method of implementing the tokenization thus includes computing multiple segmentations and choosing the most relevant or most probable one. In other words, multiple segmentations are "tried out" until the process finds the best segmentation, which is then used to generate the graph-based representation and later the actual query. Advantageously (but not necessarily), the method will test all possible segmentations ($2^{n-1}$ if n is the number of words in a sentence). An example will be discussed in the detailed description.

Calculating the probability of a certain segmentation is relatively easy if a relevance factor for a semantic token can be retrieved from a lexicon (and such relevance factor can be stored in the lexicon when it is set up). The relevance factor is not available with ontologies on the web, so its generation for locally stored lexicons is a major technical contribution of the present invention to speed up processing and reduce the use of resources. The probability of a term can preferably be calculated by dividing the number of words in a term by the total number of words in the term sequence, then multiplying it with the probability of the term. If this process is carried out for all terms and the resulting probabilities are summed up, the result will be the probability for the whole term sequence (an example will be discussed in the detailed description). However, it has to be pointed out that other solutions for calculating the probability of a term sequence (a segmentation) are possible, like just summing up the probabilities of each term without weighting it, or the like.

In a preferred embodiment, the tokenizer additionally makes use of disambiguation rules, selecting the most probable token if a term's meaning is ambiguous. For example, pure information may sometimes have a double meaning, such as the word "Washington" in English, which can be a city or a person, or the word "Gericht" in German, which can be a court or a dish.

Step ii. of the presented method is, so to speak, a core element of the present invention. Based on the semantic tokens determined in step i., a graph-based representation of the query is generated, which represents a query as a set of nodes connected by a set of edges. The representation is computed within a transition-based procedure employing a set of transformation rules, generating stepwise the nodes, the relations and the focus of a semantic graph. For this purpose, the method employs three types of specific modification rules. This process will be described in more detail.

Referring first to nodes, a graph node $n_i$ ($\Theta$; u; $t_n$; p) is a quadruple representing one or multiple entities with the node indicator $\Theta$, the identifier u, the node type $t_n$ and the position p. The position p indicates the node's original position in the natural language query. One important concept to be mentioned here is the distinction between terminal and non-terminal nodes and/or relations. The Boolean variable Θ indicates whether $n_i$ represents a terminal or a non-terminal node.

A terminal node represents a single resource, the value for the identifier u is the resource's URI. The node type $t_n$ represents the entity's semantic role (c; r; i; ct).

Non-terminal nodes represent a set of entities and can also be referred to as variables. They receive a unique alphanumeric value for u, their node type $t_n$ is undefined.

Intuitively, one could therefore say a terminal node is a node already identified and associated with a resource and the semantic role; while a non-terminal node is a variable of undefined node type, representing one or multiple entities described by the node's relationships.

Similar consideration apply to non-terminal relationships. A graph branch $b(n_0; n_1; p; Θ)$ of a graph g is a quadruple connecting two graph nodes $n_0$, $n_1$ with a property p. The Boolean value Θ indicates whether the property specifies a specific or an arbitrary property.

Terminal branch: a branch representing a specific property, p is the property's URI Non-terminal branch: a branch representing an undefined relationship, p is identified with a unique alphanumeric id.

Note that a relationship is herein also referred to as a branch; the two expressions are synonyms in this context and interchangeable. In a preferred embodiment, the calculation of the most probable pattern for modifying an input sequence also takes into account specific values indicating that a specific patterns is correct, so-called truth values Θ.

In essence, the first step of the method is to generate the nodes representing the tokens of the chosen segmentation. This is done by employing the rules, in this context called patterns, that map the tokens into the appropriate node representation. In one particularly preferred embodiment of the invention, patterns are additionally associated with a truth value indicating to what degree the given modification is correct. A pattern employment function is used wherein a pattern defines one or more nodes, maybe together with a relationship pertaining to the particular node, which is associated with the token type or semantic role of a token. Using a truth value or confidence factor associated with a pattern, it can be determined whether the certain pattern maps the token type appropriately, and to what degree. If more than one pattern is possible to do the mapping, the most probable one is selected.

Mathematically speaking, a node pattern $p_n$ is a pattern indicating how a token is transformed into a graph node. A node pattern consists of an input sequence called the expression $e_n(t)$ consisting of a single token t, and a modification rule called the annotation $a(n^*, b^*)$ indicating a set of nodes and branches to be generated. The node type and the identifier of a node are analogous to the token type and a token's identifier. From various points of view, node patterns constitute an intermediate stage in the graph generation process. The node stage realizes relations in the form of role nodes, which are transformed into labeled edges in the next stage. A specific form is the generation of class nodes, which already realize a node relationship: As a class node represents a set of entities of the specified class, the pattern includes the generation of a non-terminal node (to be explained below) connected with the generated class node.

The next (second) step is to generate all relations between the nodes computed in step 1 that can be identified to complete the graph-based representation. This is done by employing one or multiple patterns focusing on the identification of missing relations between nodes. As in the previous step, a truth value, preferably between 0 and 1, can be used to judge whether a particular relationship is a good match or not.

Again mathematically speaking, a relation pattern p(e; a; v) consists of an expression e, an annotation a and a truth value v. The expression $e(n^*, b^*)$ consists of a set of nodes and branches indicating the input elements, while the annotation $a(n^*, b^*)$ is a set of nodes and branches indicating the transformation of the expression into one or more branches. The annotation must contain at least one token from the expression. The truth value v(0; 1) indicates the probability that the given correlation is correct. The annotation indicates how the token sequence is transformed into a set of branches.

As the query represented by the graph expresses an information request, a graph has to contain at least one non-terminal element. Other than the representation of a general set of relations within a graph, the realization of a search request requires an element identified as the query's major element indicating the requested data, called the graph's focus. The focus determines the major request entities or facts that are described by the graph, that is, the elements the query searches for. The purpose of the third step of the presented method thus is the identification of a non-terminal element of the graph, namely either a non-terminal node or a non-terminal branch, representing the focus of the query.

A focus f of a graph g is an entity of the graph representing the elements that are to be retrieved. A focus can either be a node $n_f$ or a branch $b_f$. Each graph can have only one focus.

Focus Node $n_f$: A focus node represents the entities that are to be retrieved. The semantic graph represents an entity request. If the focus node is connected with a class node specifying the type of the focus node, the class node's URI is called the focus type of the parse.

Focus Branch $n_b$: A relation between two nodes identified as the focus represents a query for a certain property of a node. The semantic graph represents a fact request.

The focus of a token sequence is identified with focus patterns, which identify a graph's focus as well as its request type. Again, a focus can be determined by using patterns (focus patterns), as already described in connection with steps one and two. In this context, a focus pattern $p_f$ is a pattern identifying the focus of a graph g. It consists of an expression of consisting of a token sequence an annotation $a_{f,r}$ wherein (f) is a single element indicating the identifier of an element of the expression that is identified as the token sequence's focus as well as the query's request type r a truth value Θ

Employing a graph-based view of a natural language query, the method divides the possible entities a query can search for into two base forms of query types: A query can search for resources (e.g. persons, cities), i.e. nodes, or the query searches for a relation of an entity, such as the value of a specific property or the relationship between two nodes (e.g. birthday of a person), i.e. a branch (relationship). An identified focus node thus represents an entity search, while a focus branch indicates a request for a specific relation, i.e. a fact search.

It is understood that the above steps one to three can be performed simultaneously, e.g., through the use of look-up tables. However, in view of the required programming effort and execution time, the preferred solution executes these step by step, such that an advantageous embodiment of the invention may include the following method steps:

a) employing a rule or a pattern with a specific token type, for example a class, an instance, a role or a constraint for each semantic token
   wherein each rule or pattern defines one or more nodes, and/or one or more relationships, associated with the token type of such semantic token,
b) generating further relationships between the nodes and/or relationships by the use of further patterns to complete the semantic graph,
   wherein each relation pattern defines one or more nodes and/or relationships as input and one or more nodes and/or relationships as output
c) selecting one of the non-terminal nodes or non-terminal relations as a graph focus
   wherein a focus pattern defines one ore multiple nodes and/or relationships as input, and a single non-terminal node or non-terminal edge as the graph's focus.

Looking at a device suitable for implementing and/or using the method described above, the invention relates to a digital device, in particular digital computer such as a server or a client or a mobile digital device, connected with at least one database containing semantically structured resources, preferably on a network like the Internet, comprising:
i. query input circuitry for entering, generating or receiving a query, in particular a natural language query,
ii. a parser for generating a focus query including:
   a) a tokenizer operatively connected with at least one lexicon, for example a database, for segmenting the query into terms, in particular one or more words, and mapping them into semantic tokens via the lexicon,
      wherein the lexicon contains at least the token type of a semantic token, in particular class, role, instance and/or constraint,
   b) a node/relationship/focus generator for generating the one or more nodes and/or one or more relationships of a graph-based query representation, distinguishing between terminal and non-terminal nodes or relationships and selecting a non-terminal node or a non-terminal relationship as the graph's focus,
iii. a query performer for generating a database query for the focus and the token type of the semantic tokens determined in the previous steps and sending it to the at least one database,
iv. a result processor for receiving responses from the at least one database and listing, structuring, ranking and/or merging them,
v. result output circuitry for displaying, indicating, storing or sending the processed results.

Many of the elements mentioned in the digital device aspect of the present invention are already apparent from the previous description of the underlying method. However, the basic elements of input and output circuitry, the parser, the query performer and the results processor should be specifically mentioned here.

The parser, one of the essential elements of the present invention, includes the tokenizer and the node/relationship/focus generator. In the above example, the node/relationship/focus generator is described as one component. However, in a preferred embodiment, three components are used. Accordingly, the parser for processing a natural language input consists of the following components:
a) a tokenizer operatively connected with one or more lexicons,
b) a node/relationship generator for generating at least one node and/or a relationship for a semantic token with a predefined node type, in particular a class, a role, an instance and/or a constraint,
c) a relationship generator for generating further relationships between the nodes until a full representation of a mathematical graph is obtained, and
d) a focus generator for selecting a non-terminal node or a non-terminal relationship of the previously generated graph, preferably the most relevant non-terminal node or the most relevant non-terminal relationship.

The 3 generators described in b), c) and d) function essentially as described in the context of the underlying method. In a preferred embodiment, the process of retrieving semantic tokens from a lexicon is separated from the main device in one or multiple modularized components, called vocabulary-modules. These modules communicate through well-defined interfaces with the main device, enabling a flexible implementation of the system's lexicons. Within a tokenization procedure, each vocabulary module receives a segmentation of the natural language query and retrieves a set of tokens from its associated lexicon. The advantages of the modularization of a NLI's access to its vocabularies are the possible employment of multiple vocabularies as well as the independence towards the system's domain. Vocabulary Modules can easily be added or removed at runtime without interrupting or modifying the main system, which increases speed and, in particular, adaptability of the system.

The system's second component is the query performer, which receives a logical intermediate query representation of the natural language query from the parser, generates a database query and sends it to the at least one database. The intermediate representation, namely the semantic graph generated within the three steps above is employed to generate a valid database query appropriate for the database consulted, such as SQL, SPARQL or XQuery. The query is sent to the database, and the response is received, thus completing the search process.

While the present invention requires sending the query to at least one database, in an advanced embodiment, the query is sent to more than one database, or to one or more selected databases from a multiplicity of databases. In this way the wealth of information that can be retrieved is increased, since many of these databases have a specific domain. In this embodiment, each of the system's knowledge sources is registered with one or multiple identifiers indicating the knowledge source's domain, i.e. its focus type(s). If the parser identified a focus type of a query's semantic graph as described above, the query performer selects appropriate knowledge sources for a query by comparing the query's focus type with those of the registered knowledge sources. In this way the system identifies data sources which are expected to have the requested information available. For example, if a query is related to a natural person, it may be prudent to send the query to a general-purpose data source such as DBpedia, or to the Application Programming Interface (API) of a social network, but not to the geospatial database LinkedGeoData[1]. This approach thus saves processing and network time; i.e., it reduces the amount of resources needed and will speed up the process. This is an easy-to-implement way of speeding up the process of retrieving information from a multiplicity of knowledge sources, and no queries are sent to databases which are not expected to contain relevant results, thus reducing network traffic and relieving databases focusing on other domains from processing a request. In a preferred embodiment of the device, in a similar fashion as the parser component's vocabulary modules, the process of consulting the system's knowledge sources is performed by separated components, called data modules. These modules contribute to the system modularity by separating the highly customized process of generating a valid database query from the main system. This is easily possible because each database module is assigned to one specific knowledge database on the network. They communicate with the query performer through well-defined interfaces and can dynamically be added or removed, thus providing the system a flexible and easily adaptable variety of knowledge sources. A data module receives the intermediate representation generated by the graph-based method described above and generates an appropriate database query for its associated knowledge base; it returns a set of search results, preferably enriched with a relevance factor and diverse meta data such as a title, a description, an image URL and/or geospatial coordinates of the retrieved result.

[1] http://linkedgeodata.org

The inventive method preferably also includes the step of merging, selecting and/or ranking the responses. This aspect is of particular importance if the intermediate representation of the query has been sent to more than one knowledge database on the network, but can also be applied if only one database has been contacted. The result processor merges results retrieved from one or more data sources and additionally generates a relevance factor for each search result, which is the base for a ranking of the retrieved search result set. It returns a list of search results that can be interpreted by a human being, or further processed by a machine.

The steps performed by the inventive method can be implemented in hardware components, by microprogramming or any other suitable technical method. However, in one advantageous embodiment of the invention, it can be embodied in a computer program, which can be executed on a digital computer. The invention also relates to a computer program product that can at least partially be loaded into the internal memory of a digital computer, in particular a server, that includes instructions for executing the steps according to the inventive method when executed on such digital computer. The computer program product can be a tangible medium such as a compact disk, a USB stick or the memory or the hard disk of a digital computer; however, it can also be stored on a network computer and be downloadable over the network. In an advantageous embodiment, the digital device is server-based, and the human interface is located on a user-operated client. In other words, the search engine runs on a server, and the user-operated client can be a less powerful device and/or even be connected with the server through a relatively slow connection such as a telephone modem or a wireless link. This is because the user-operated client only needs to run a human interface program (in order to enter a natural language query and receive the results) and does not have to process the query itself. This is all done on a server, which may also have a much faster connection to the Internet, or another network, available.

Taking the invention from a more hardware-oriented perspective, it also relates to an apparatus for performing natural language searches comprising:
 i. at least one user input interface for entering user queries,
 ii. a digital processor directly or indirectly connected with said user interface, and further directly or indirectly connected with instruction/data storage means including:
  a) a tokenizer memory containing instructions and/or data for tokenizing such user-entered queries from terms into semantic tokens, wherein such tokenizer is connected with at least one lexicon,
  b) a node/relationship memory containing instructions and/or data, in particular node pattern data, for generating nodes and/or relationships for semantic tokens with a predefined token type,
  c) a relationship memory containing instructions and/or data, in particular relationship pattern data, for generating further relationships between the nodes,
  d) a focus memory containing instructions and/or data, in particular focus pattern data, for selecting a non-terminal node,
  e) a query memory containing instructions and/or data for generating a database query and sending it to at least one database operatively connected with the digital processor,
  f) a results memory containing instructions and/or data for processing responses from the at least one database,
 iii. at least one user output interface directly or indirectly connected with said digital processor for displaying, indicating or storing the received results.

Other features and advantages of the present invention are described in the appended claims. It should be noted that the invention relates to all possible combinations of claims, or features disclosed in this description, even if they make no particular reference to each other.

The invention thus provides the technical means described herein, such as the parser, the query performer, the result processor etc., together with the related computer and network components and the software, for solving one or more of the objects described at the outset.

Since the search is better directed or tailored, processing, network and computer time are reduced i.e. the search is performed faster and with less use of technical resources. That way, less powerful computers, and/or less powerful network connections (or network connections with a lower transmission rate such as wireless connections) can be used to process the search within an acceptable time frame. Elements and resources on the web are used, addressed and controlled in a novel technical way using different or differently expressed queries and commands; for example, data sources that may not contain relevant information are not queried, and queries sent to other databases are better tailored to the search.

The technical modularity realized in the separated components parser and query performer, as well as in the provision of vocabulary modules and data modules, increases the flexibility and reusability of the system's components.

Further, in a client/server configuration, all time consuming processing steps can be executed by the server, such that the client side only needs to run a user interface; and the traffic between them is reduced to a minimum because only the search is communicated from the client to the server, and the results are fed back the other way. The invention is therefore ideally suited to be operated on mobile phones and other clients with a limited communication rate (transmission speed).

From the user perspective, the main advantages of the present invention are the increased speed, the ability to perform effectively a natural language search, the accuracy of the results and the reduced number of less relevant hits. The natural language search does not require to enter keywords in the correct grammatical order, as is the case with other parsers (e.g., grammar-based parsers).

BRIEF DESCRIPTION OF THE DRAWINGS

The accompanying drawings depict certain preferred embodiments of the invention. In the drawings.

DETAILED DESCRIPTION OF THE INVENTION

Exemplary and preferred embodiments of the invention will now be described in detail, with reference to the accompanying drawings.

Figure 1:
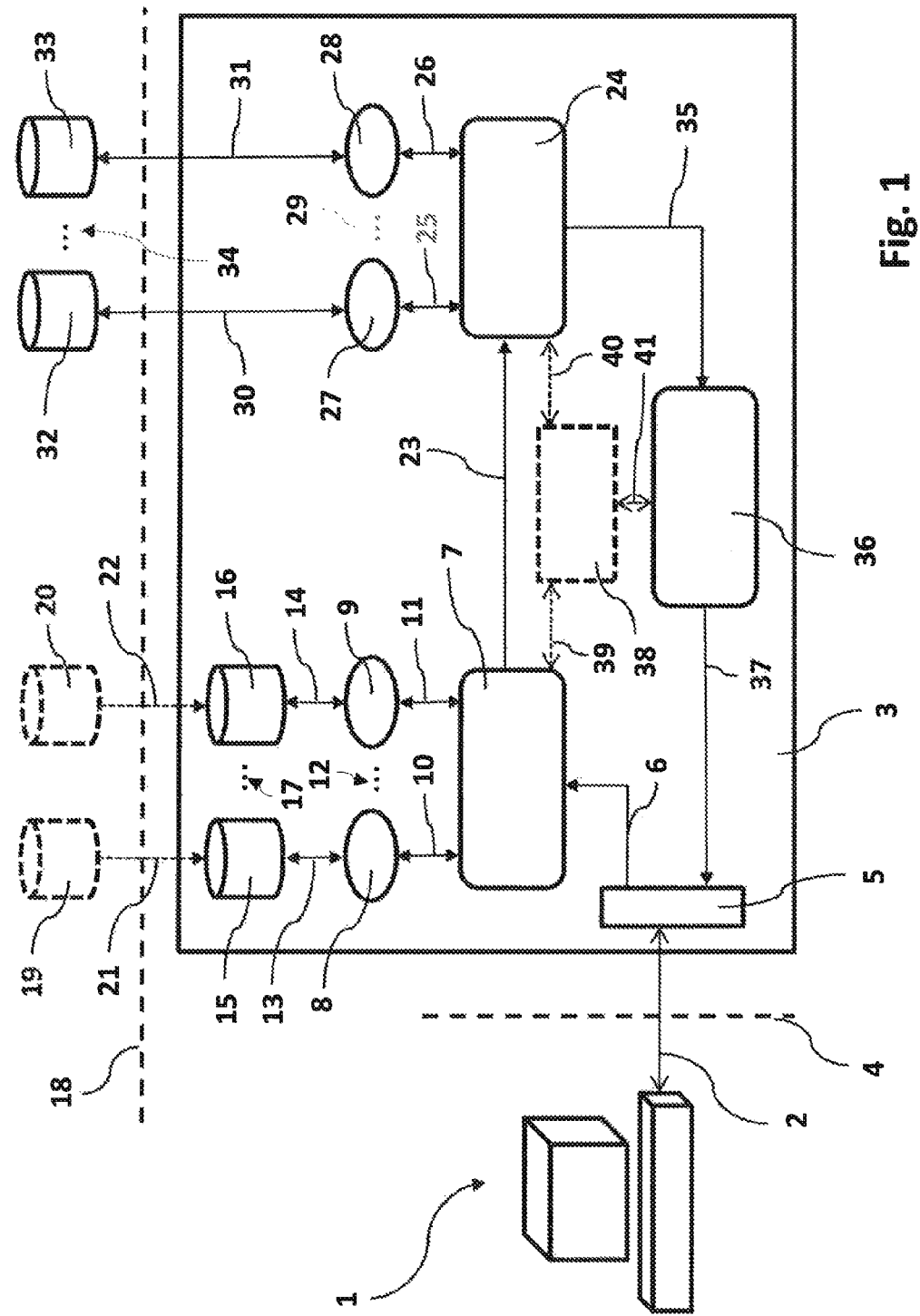
FIG. 1 is a block diagram illustrating some major hardware and software components of the invention.

FIG. 1 shows some of the major components of the search processing environment according to this invention. A client 1, which is shown as a desktop computer but could also be any other sort of computer, mobile phone, tablet computer or any other kind of digital device (even some sort of terminal), is connected through a communication line 2 with a server 3. Communication line 2 can e.g. be an electrical wire, an optical cable, a wireless RF connection, an infrared connection or the like. The separation between the client 1 and the server 3 is indicated by the dotted line with reference numeral 4.

In this configuration, the client 1 is mainly used for entering a search query and displaying the results of the search, while most of the actual processing is done by server 3. It is understood, however, that this is only one exemplary embodiment and that the search processing components could also be incorporated (partially or in full) in the same computer that is used for query entry.

The communication between the client 1 and the server 3 is routed through interface circuitry 5, which works on a bidirectional basis.

Figure 2:
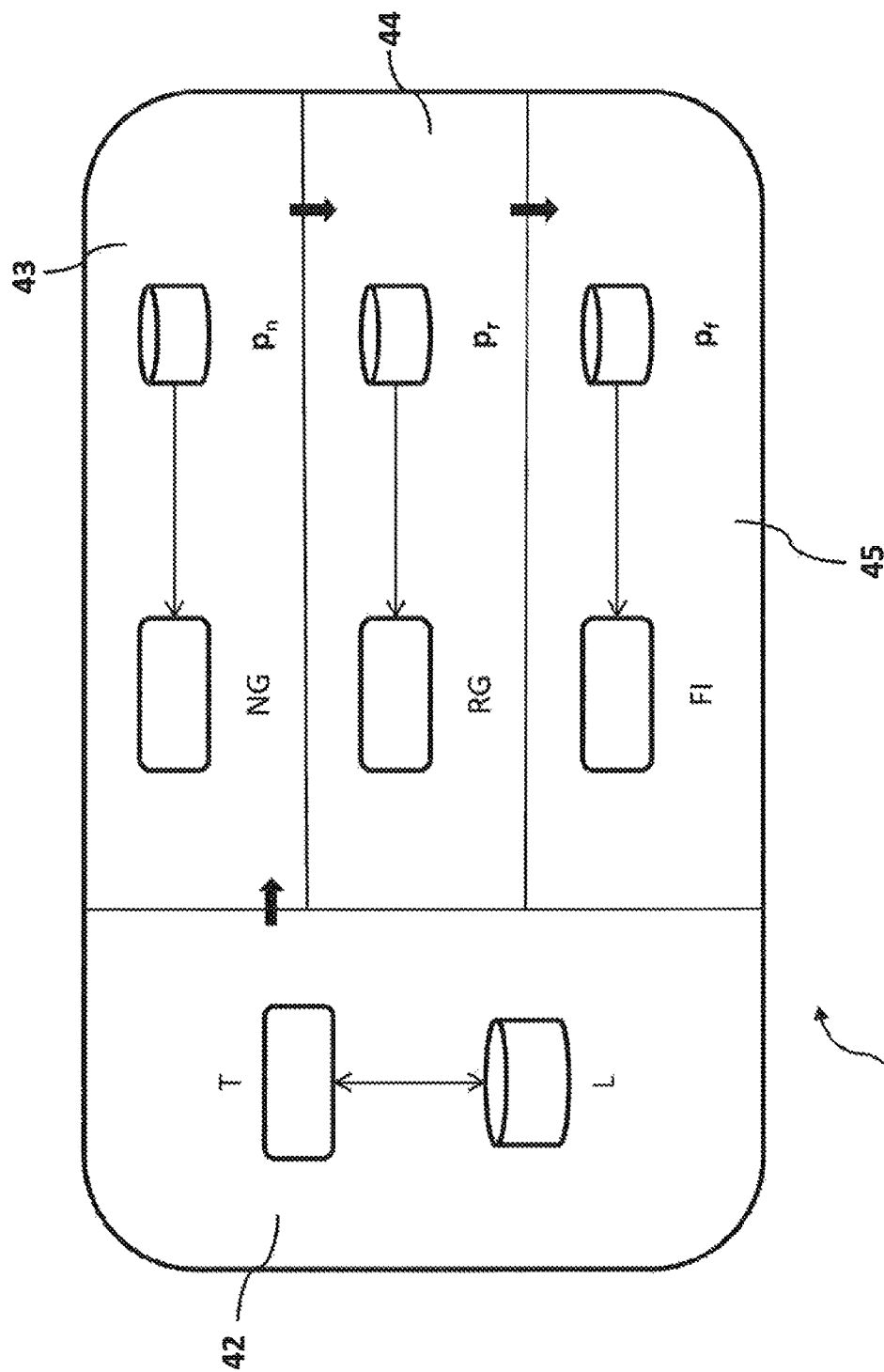
FIG. 2 is an enlarged block diagram of reference numeral 7 of FIG. 1.

Signals from interface circuitry 5 (including data representing a natural language search) are routed (line 6) to parser 7 (which will be disclosed in more detail in FIG. 2). The parser, whose main task is to process the query and generate a graph-based logical intermediate representation, communicates with one or multiple vocabulary modules 8 and 9 through connections 10 and 11. As indicated by dots 12, there may be more than 2 vocabulary modules (there can also be only one). While the vocabulary modules are shown as part of the server 3, they could also be located on the distributed network.

The vocabulary modules 8 and 9 communicate through bidirectional connections 13 and 14 with lexicons 15 and 16 (or more of them, as indicated by dotted line 17; however, it is also possible to have only one lexicon). The lexicons are preferably implemented as databases, associating terms with resources on the web. They hold database tuples for mapping terms into tokens (as will be explained below), wherein each tuple usually contains a term a token type (e.g. class, property, instance, constraint)

a Uniform Resource Identifier (URI)

a relevance factor indicating the degree of correlation between the term and the token The purpose of the vocabulary modules 8 and 9 is to adapt the output of the parser 7 to the structure and query language of the lexicons 15 and 16. Parser and vocabulary modules communicate through well-defined interfaces, e.g. via HTTP, where the output of the vocabulary modules can be expressed in an appropriate format, e.g. as an XML encoded string. That way, the token retrieval process is independent of the underlying database management system.

In FIG. 1, dashed line 18 symbolically represents the separation between the server 3 and a distributed network. The network can e.g. be the World Wide Web on the Internet, or another like network.

In the context of the present invention, the lexicons 15 and 16 can be set up and constructed manually as well as using existing ontologies on the web. The possible employment of existing ontologies is expressed by a dotted representation; that is, the dotted ontologies 19 and 20 represent data corpora that were possibly employed for constructing the lexicons 15 and 16 in the first place, as indicated by dotted connectors 21 and 22. The dotted representation indicates that these elements need not be used during the actual processing of a search, but rather have been used initially to set up the lexicons 15 and 16. It is understood that this way of making syntactical information available is specific for the particular embodiment of the invention shown in FIG. 1, and that other arrangements could be chosen. For example, the vocabulary modules 8 and 9 could be placed on the network, rather than inside the server.

The syntactic parser 7, whose operation will be described in more detail below, is connected (line 23) with a query performer 24. The query performer interacts (bidirectional connections 25 and 26) with data modules 27 and 28 (or more of them, see dots 29). The data modules 27 and 28, in turn, are connected (bidirectional connections 30 and 31) with knowledge databases 32 and 33 (or more of them, see dots 34). The knowledge databases can be queried independently from their underlying database management system;

they can be located locally, i.e. in the server 3, e.g. as relational databases, or be located and accessed on the web. Examples of remotely accessed knowledge databases are SPARQL endpoints (e.g. provided by DBpedia or Linked-GeoData) or Application Programming Interfaces (APIs) of data providers on the web.

In this context, query performer 24 executes several important tasks in conjunction with data modules 27 and 28. The query performer receives a query in the form of an intermediate query representation (which represents the semantic graph generated by the parser) from parser 7 (connection 23) and identifies the knowledge databases that may contain the requested information. For example, if the query is related to information about a natural person, relevant information may be found in a social network but not in a geospatial database; accordingly, the query performer 24 may decide to contact the API of a social network but not the geospatial database. This is an important aspect of the present invention since it helps reducing processing and network time by avoiding contacting all available knowledge databases. Rather, the hardware and software components of the invention are set up such as to communicate only with the relevant knowledge databases with respect to a query.

The data modules 27 and 28 transform the intermediate query representation into the relevant query language used by the associated knowledge database, e.g. a SQL query for relational databases, a SPARQL query for RDF repositories, or a HTTP request for Application Programming Interfaces of external applications.

The response from the relevant knowledge database is then fed back to the query performer 24 via data modules 27 and 28 and routed (communication line 35) to result processor 36. The result processor merges the results received from the various knowledge databases/data modules to one result set, removes redundant search results and ranks the results. The retrieved result set is returned and may contain meta data for a textual or visual output presentation. For example, if the search retrieved location-based entities, these could be shown on a map which is displayed in addition to the result list. The generated result set of the result processor is then fed back (communication line 37) to interface circuitry 5, which returns the result set in an appropriate format, e.g. in XML, to the client.

The operations inside the server 3 are executed under control of a processor, which is schematically indicated by reference numeral 38. Dotted lines 39, 40 and 41 indicate the control lines to the various modules.

It is a very important aspect of the present invention that the underlying vocabularies (lexicons 15, 16; vocabulary modules 8, 9) are independent (separated) from the parser 7 by communicating through well-defined interfaces. By means of this independence or modular architecture, it is possible to add or remove new lexicons dynamically such that further vocabularies can be included independently of their underlying data format. Analogously, the data modules 27, 28 querying knowledge sources for information retrieval 32, 33 are independent (separated) from the query performer 24. In this way new knowledge sources can be added or removed independently from the underlying database management system.

Turning now to FIG. 2, the parser 7 is shown in more detail. One of its main elements is the tokenizer 42, which recognizes logical units within a query with employing one or multiple lexicons. The other major elements, which form an important and novel aspect of the present invention, are node generator 43 (sometimes herein also called node/relationship generator, for reasons to be explained below), relationship generator 44 and focus generator 45, each of which employs a set of specified patterns. The three generators 43, 44 and 45 are also referred to as semantic interpreter and could also be incorporated in a joint or common component. All these components will now be explained in detail.

For the scope of this invention, the term "tokenizer" refers to the process of segmenting and identifying logical units referring to a semantic entity. It is not used uniformly throughout the literature.

The tokenizer first performs some syntactical steps to prepare a natural language query for the tokenization. Such preparation may include steps like the removal of punctuation marks, putting the input sentence in lower case spelling, removal of stopwords and/or computing the words' stems such as replacing plurals by the singular and/or putting verbs into present tense.

After these preparatory steps, the first main task of the tokenizer is to break up the query into terms, i.e. a word or a set of words that are possibly referring to a semantic entity. This process is called segmentation herein. Typical segmentations of the exemplary natural language query "birds of new zealand" (which will be used further herein to demonstrate the properties of the invention) is depicted in FIG. 3 (one will note that in this example, not all preparatory steps have been performed—which is perfectly legitimate—, since "birds" is still in the plural, and the word "of" could be considered as a stopword).

Figure 3:
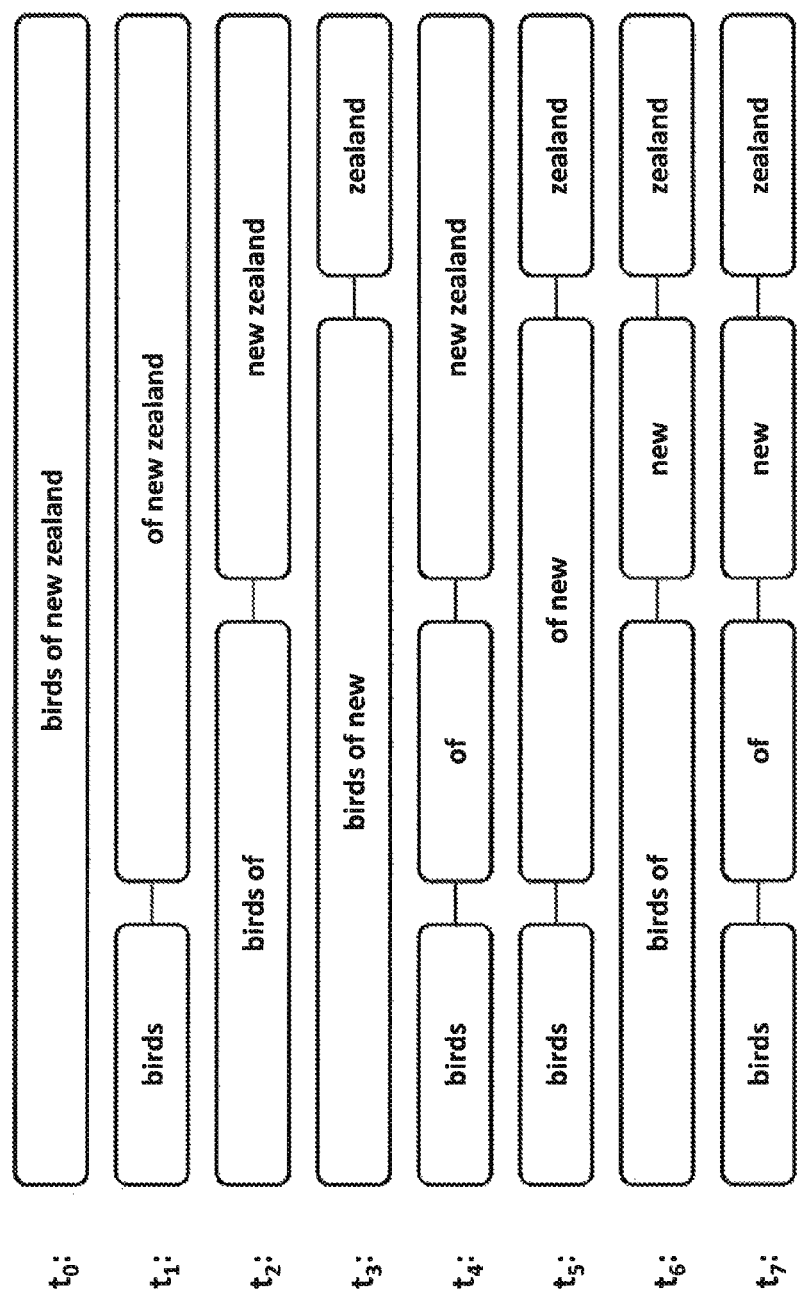
FIG. 3 depicts, by means of a simple example, how the tokenizer segments a simple query into terms.

FIG. 3 shows the 8 possible segmentations of the sentence "birds of new zealand" which will be called "term sequences" $ts_0$ to $ts_7$ hereinafter. Essentially, the tokenizer recognizes all words in the query and puts them together in all possible combinations, but keeping the word order. For example, in term sequence $ts_2$, the query has been segmented into the two terms "birds of" and "new zealand". Given n words in the query, it can be shown that the number of possible segmentations (or term sequences) is $2^{n-1}$. In the present example, since n=4, the number of term sequences is 8. It has to be pointed out that the segmentation process (generation of term sequences) described herein is only exemplary and can be implemented differently if desired. For example, in the given example, the word "of" could be recognized as a stopword in the preparatory step, which would reduce the number of term sequences to $2^2$=4 and thus make the further processing faster and less resource consuming.

Figure 4:
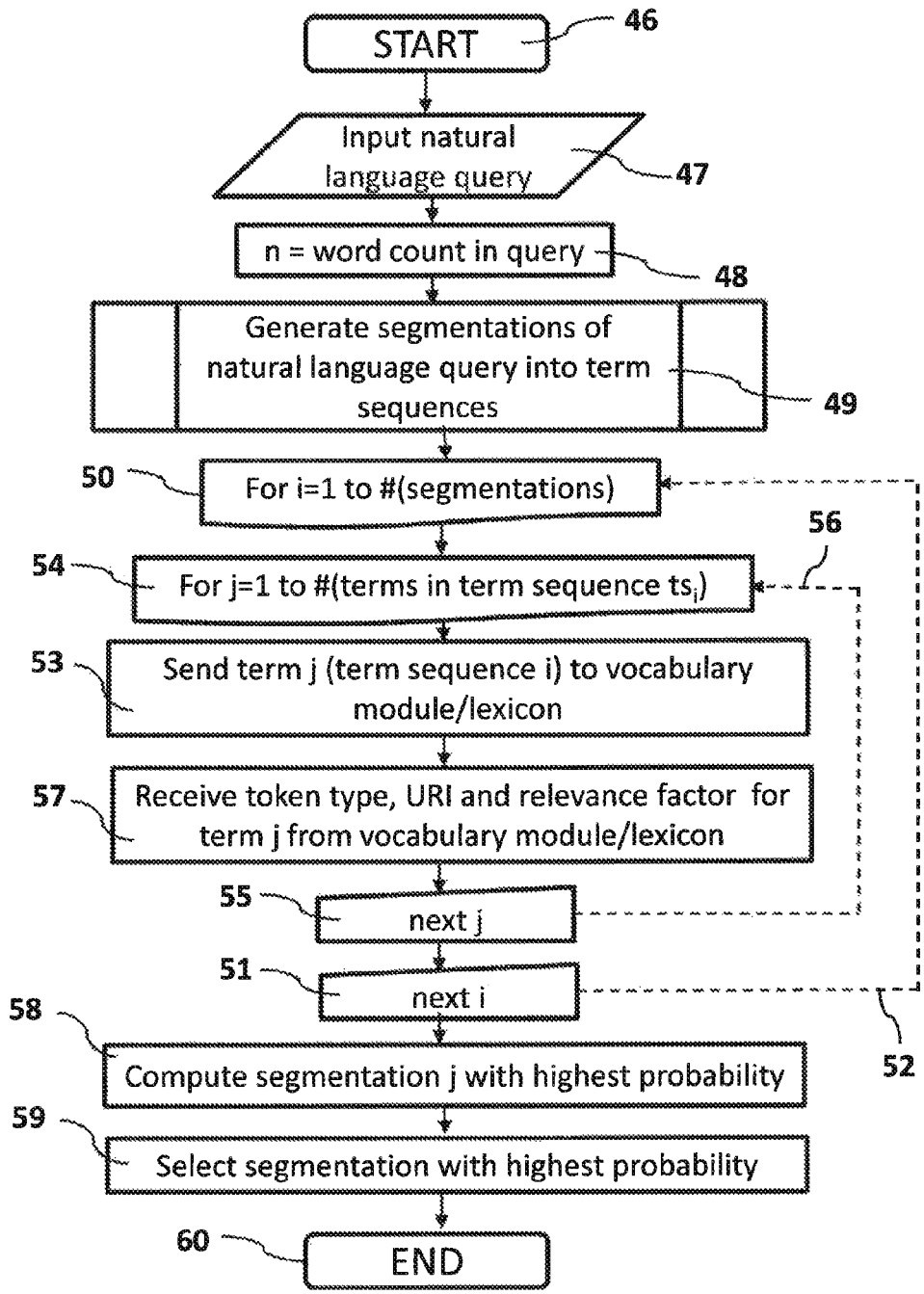
FIG. 4 is a flow chart illustrating the main process steps performed by the tokenizer.

Reference is now made to the flow chart of FIG. 4 in which the basic operating steps of the tokenizer are shown. After entering at "START" label 46 and the input of the natural language query (step 47), the tokenizer counts the number of words in the query (step 48) and then executes the segmentation of the query into term sequences (step 49). This is essentially the process described above with reference to FIG. 3.

After the segmentation, the tokenizer executes a loop for each of the term sequences. The loop counter is called "i" (reference number 50, 51, 52), and it counts from 1 to the number of segmentations, which is $2^{n-1}=2^3=8$ in the given example, as discussed above (n, the number of words, is 4).

During each execution of the loop, the tokenizer sends (reference number 53) the relevant term j of a term sequence $ts_i$ to a lexicon, preferably through a vocabulary module (cf. reference numerals 15 and 16; 8 and 9 in FIG. 1). This step is executed for each term $t_j$ in the relevant term sequence $ts_i$, as exemplified by a second (inner) loop 54, 55, 56 with a counter j that counts the terms in a particular term sequence.

The lexicon/vocabulary module responds, for each term in the term sequence $ts_i$, with a token type ($\pi$), an identifier (u) and a relevance factor (r) (step 57). That way, each term in the term sequences undergoes a mapping of the form $$t_j(ts_i) \rightarrow T(\pi, u, r)$$

wherein $t_j$ is the term with the index j in the term sequence with index i, and T is a token of token type $\pi$, with a URI u and a relevance factor r.

The token type $\pi$ can preferably be one of the following:
- a class (e.g., "bird")
- a property, sometimes also called relation or role (e.g., "lives in")
- an instance—in plain words, a specific object (e.g., "George Washington" or "London") or
- a constraint, sometimes also called a restriction (e.g., "40 years")

The URI has commonly a form like http://dbpedia.org/resource#New_Zealand, and the relevance factor is typically a number between zero and 1.

In general, the operations performed in steps 50-57 transform or map terms into tokens.

In step 58, the tokenizer computes the segmentation, or term sequence $ts_i$, with the highest probability of being correct. This is done by using the relevance factor r and will be explained below with reference to FIG. 5. Thereafter, the tokenizer selects the segmentation or token sequence with the highest probability (step 59), which will be used for further processing, after which operation of the tokenizer comes to an end (step 60).

The step of selecting the segmentation or term sequence with the highest probability is now explained with reference to FIG. 5, wherein two exemplary term sequences $ts_2$ and $ts_4$ of FIG. 3 have been chosen. In $ts_2$, the lexicon returns a zero set (reference number 61) in return to the query "birds of" (reference number 62), since the term "birds of" is not known or found. This also means that the probability for this term is 0. In contrast, the term "new zealand" is found (reference number 63), such that the lexicon returns a relevance factor of 0.99, together with the information that this is an instance, and the resource found is New_Zealand (reference number 64).

The probability that term sequence $ts_2$ is appropriate is now calculated as follows: The number of words in a term is divided by the total number of words in the term sequence, and the result is multiplied by with the relevance factor. This process is repeated for all terms, and the resulting probabilities for all terms are added up to give the total probability that the chosen term sequence is the correct one. For $ts_2$, this reveals $$p^{T2} = 2/4 * 0 + 2/4 * 0.99 = 0.495$$

Figure 5:
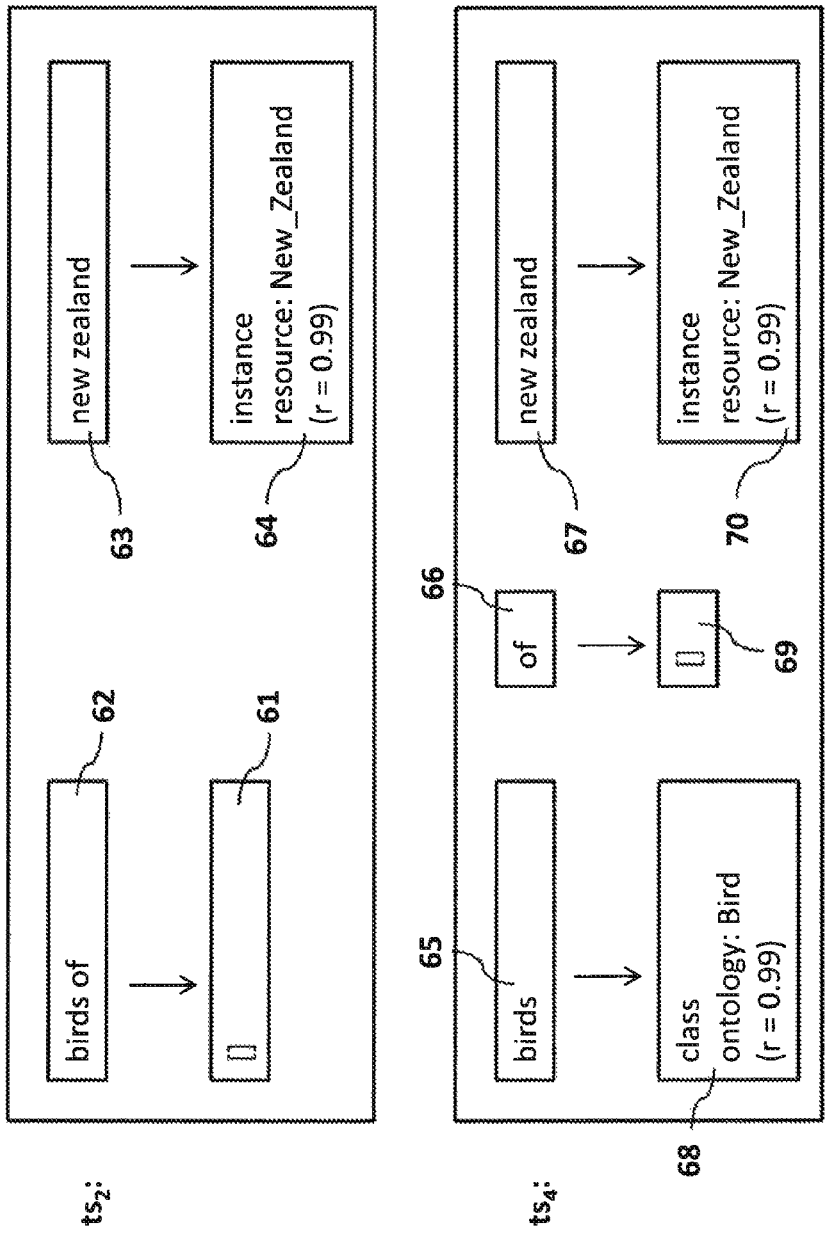
FIG. 5 illustrates the mapping of terms into tokens by showing two representative term sequences and the mappings obtained from a lexicon.

The second example in FIG. 5 relates to term sequence $ts_4$, with a segmentation into "birds" (reference number 65), "of" (reference number 66) and "new zealand" (reference number 67). "birds" is found with a relevance factor of 0.99 (reference number 68); "of" is not found and returns the zero set with a relevance factor of 0 (reference number 69); and "new zealand" is found with a relevance factor of 0.99 (reference number 70). The probability equation for $ts_4$ thus becomes $$p^{T4} = 1/4 * 0.99 + 1/4 * 0 + 2/4 * 0.99 = 0.7425$$

It can be easily seen that the probability for $ts_4$ is higher than the probability for $ts_2$. In fact, when calculating the probabilities for all term sequences, it turns out that $ts_4$ has the highest probability of all term sequences and will therefore be chosen by the tokenizer as the segmentation with the highest probability (see step 59 in FIG. 4).

Figure 6:
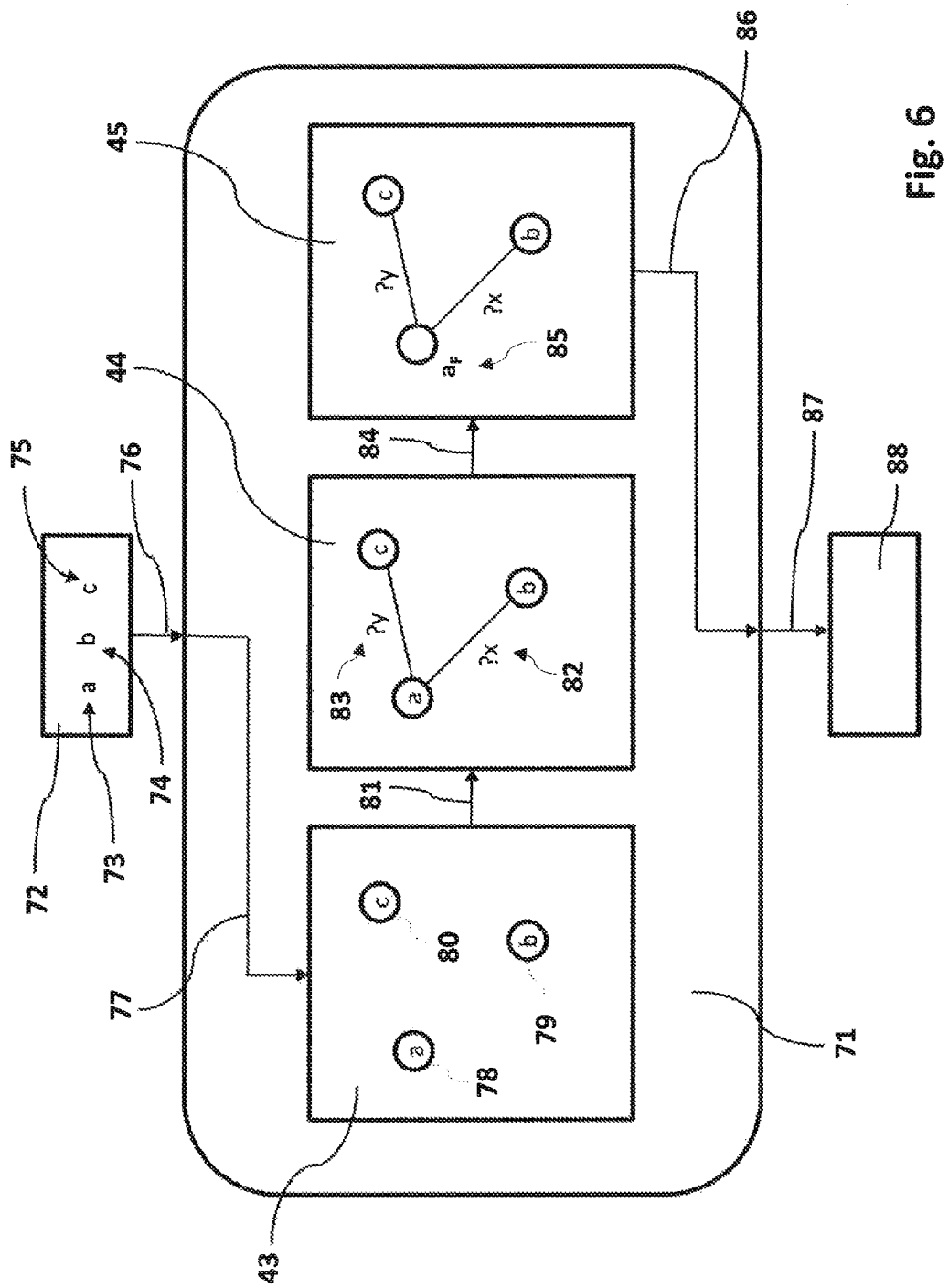
FIG. 6 depicts the basic functionality of the node/relationship/focus generator by depicting the generation of a semantic graph.

The output of the tokenizer—i.e., the tokens of the term sequence with the highest probability—is then transferred to the semantic interpreter 71 of parser 7. FIG. 6 depicts its basic diagram to illustrate its functionality. The inner structure and functionality of the parser's semantic interpreter is considered one of the major contributions of the present invention. The semantic interpreter generates a graph-based representation of the query, which represents entities as nodes and relations between those entities as directed labeled edges connecting those nodes.

Returning to FIG. 6, the input to the semantic interpreter 71 is shown by box 72. By way of example, the input consists of 3 tokens 73, 74 and 75 which are labeled "a", "b" and "c" and which are fed to the semantic interpreter (reference number 76). Tokens a, b and c could e.g. be classes, instances, roles or constraints, as described above. The semantic interpreter or node/relationship/focus generator 71 actually has three main components, namely the node generator or node/relationship generator 43, the relationship generator 44 and the focus generator 45. These are the same elements already schematically depicted in FIG. 2.

While the 3 generators 43, 44 and 45 can be described as separate components with different functionalities, one could also say that they are sub-components of the semantic interpreter node/relationship/focus generator 71. This is merely a matter of convenience. Both descriptions apply equally to the present invention. For the purposes of this description, the generators are shown in the figures as individual components of the semantic interpreter, but other descriptions could be chosen.

The input to the semantic interpreter is first fed (reference number 77) to node generator 43, which generates the nodes (and some implied relations) for the graph-based representation. This is indicated by nodes 78, 79 and 80. It is important to note that some tokens require the node generator to generate not only a node relating to a token, but also a relationship associated with such token. This is for example the case for a token representing a class or a role, as will be shown below. It is however important to note that all relations generated by the node generator each relate only to the particular token and not to the relationships with its peer tokens. This distinguishes the node generator 43 from the relationship generator 44. However, in the light of these explanations, it will be appreciated than node generator 43 could (and will) also be designated as "node/relationship generator".

As shown in the schematic overall diagram of FIG. 6, node generator 43 generates three nodes "a", "b" and "c" labeled as 78, 79 and 80 corresponding to the input tokens, and then passes control to the relationship generator 44 (line 81). The relationship generator creates the missing relations between the nodes, here indicated by reference numerals 82 and 83. Schematically, the relations are connections between the nodes labeled with "?x" and "?y" to indicate that these relations are presently unknown.

Control is then passed to the focus generator (reference numeral 84). The purpose of the focus generator is to select one of them as the query's major information request (called "focus") and generate an appropriate search query for the chosen focus.

In the example shown in FIG. 6, the focus generator has chosen token "a" as the graph's focus variable, which is thus labeled "$a_F$" ("F" represents the label "focus").

The generated labeled graph can also be denoted using a triple-based notation, which represents the base for the intermediate query representation, which is then passed (lines 86 and 87) to the output 88 (which is the query performer).

Figure 7:
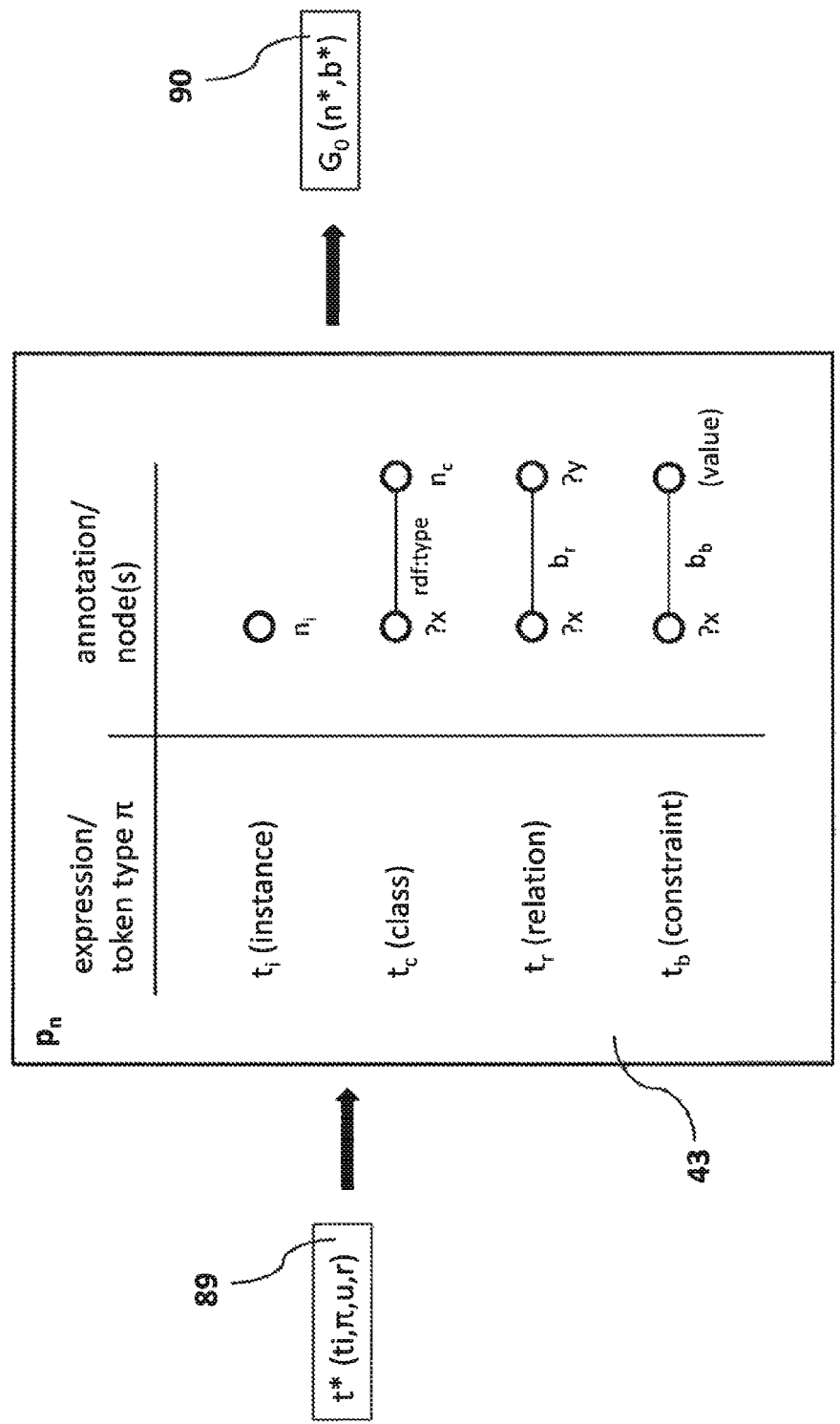
FIG. 7 shows, by means of some sample node patterns, the operation of the node generator.

Operation of the three generators 43, 44 and 45 will now be explained in more detail by means of the following figures. FIG. 7 is a simplified table-like representation of various node patterns of the node/relationship generator 43. A token 89 which is characterized as t ($t_i$, π, u, r)—wherein $t_i$ is the term identifier, π is the token type, u is a uniform identifier and r is a relevance factor—is transformed into an annotation representing the generated nodes (plus some relations related to the particular token). As can be easily seen, a token with π=i (instance) is transformed into just a corresponding instance node $n_i$. In contrast, a token with π=c (class) is considered a set of entities of the specific class; the token is thus transformed into a non-terminal node (?x) representing a set of entities, connected with a class node $n_c$; the two nodes are connected through a relation indicating that ?x is of the type $n_c$. Similar considerations apply to a token with π=r (relation) (generation of two non-terminal nodes representing unknown variables ?x and ?y, connected by a relationship); and to a token with π=ct (constraint) (e.g., a height or an age) where one node is a non-terminal node and the other represents the actual (numerical) value of the restriction.—It is understood that the table of FIG. 7 is of exemplary character only and that an actual implementation may cover more token types.

In a more sophisticated approach, the node generator identifies the most probable pattern and maps the input sequence's elements to entities of the pattern's expression. The most probable pattern for a token sequence is the one whose expression resembles the token sequence the most, i.e., the pattern which maximizes the similarity function of a token input sequence and the pattern's expression. The similarity between a token sequence and an expression is computed in terms of a string similarity function. The following listing shows some examples of a mapping of node patterns, with the token element indicated by a temporal identifier (here: a) and their truth value indicated in brackets at the end of each line:

PREFIX rdf: http://www.w3.org/1999/02/22-rdf-syntax-ns
$P_{n0}$:=c[a]→?x p(rdf:type) c[a] (0.8)
$p_{n1}$:=i[a]→i[a] (0.6)
$p_{n2}$:=p[a]→?x p[a] ?y (0.6)
$p_{n3}$:=b{v}[a]→?x p[a] bv[a] (0.75)

$p_{n0}$ indicates the interpretation of a class token, which corresponds to a non-terminal node (?x) representing a set of entities of the corresponding class (c). $p_{n1}$ produces a direct transition from an instance token into an instance node (i), while $p_{n2}$ generates a labeled branch p with undefined nodes from a role token. $p_{n3}$ describes the processing of a constraint token, which consists of a property and a value restriction. $p_{n3}$ generates a branch with the token's label as the branch's label and its value as the branch's object node.

Note that a pattern also may contain new nodes with a pre-defined URI. URIs were depicted in the Figures in a short form (e.g. rdf), while the URI prefix is defined in the PREFIX preamble.

Once the most probable pattern has been computed, the node generator computes a mapping between the token sequence and the expression sequence which assigns input tokens to expression tokens. The output sequence is indicated by the pattern's annotation by generating an output sequence from the expression. If the annotation contains an element of the expression for which no element of the input sequence could be found, the node generator generates a non-terminal node.

The output of the node generator is the first stage of the semantic graph $G_0$ 90, which may consist of a set of nodes and a set of branches.

Figure 8:
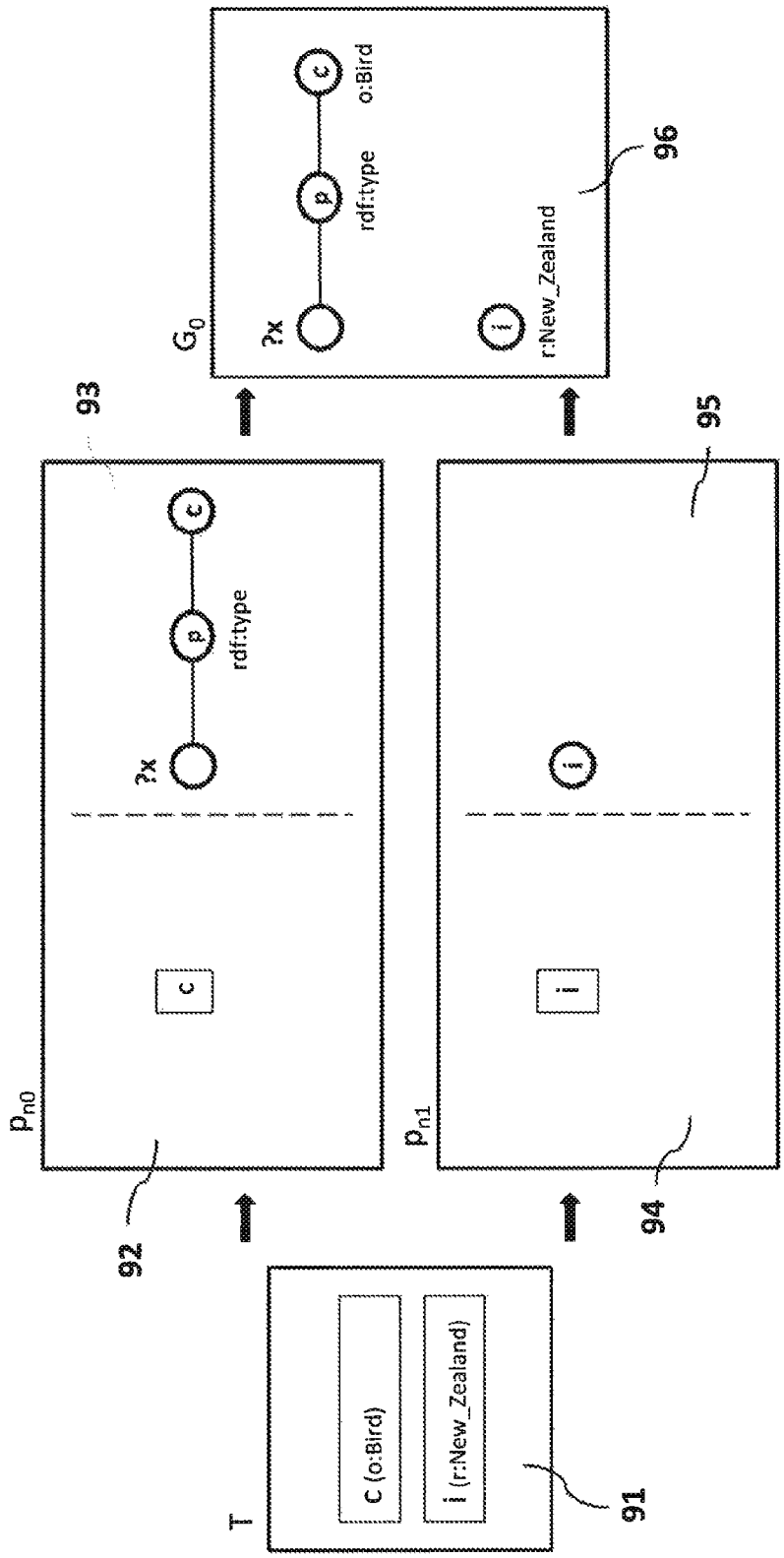
FIG. 8 depicts the basic operation of the node generator using pattern employment on a token sequence.

FIG. 8 schematically depicts the node pattern employment for the token sequence of the sample query introduced above. The node generator receives the tokenization T 91 and employs a node pattern for each token, namely for a class and an instance token in this example with the patterns $p_{n0}$ and $p_{n1}$. The pattern $p_{n0}$ transforms a class token 92 in a non-terminal node connected with a class node indicating that the non-terminal entities are instances of the corresponding class 93. Pattern $p_{n1}$ transforms an instance token 94 into an instance node 95. The generated nodes are depicted in the graph stage $G_0$ 96 (a concrete example of $G_0$ 90).

Figure 9:
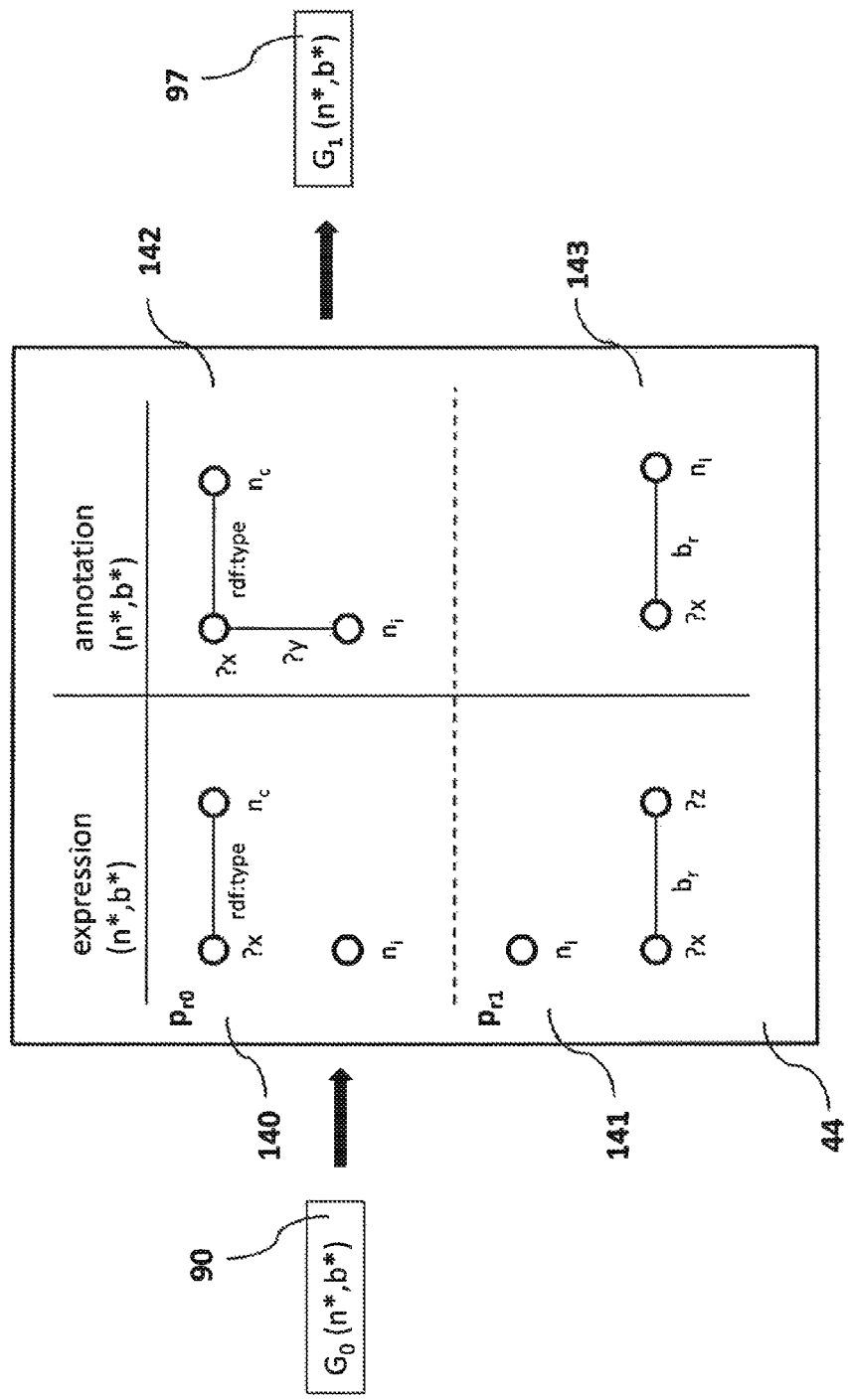
FIG. 9 illustrates the basic operating principle of the relationship generator, by means of some sample relationship patterns.

A simplified operating scheme of the relationship generator 44 is shown in FIG. 9, depicting some sample relationship patterns $p_{r0}$ and $p_{r1}$. The relationship generator receives the intermediate graph stage $G_0$ 90 generated by the node generator, employing a set of relationship patterns in order to identify further relationships between the graph's nodes. $p_{r0}$ 140 provides a simple pattern indicating that a non-terminal node of a specific class and an instance node are connected with a non-terminal relation ?y 142. $p_{r1}$ 141 merges an instance node and a branch with undefined nodes, substituting the object node of the branch (?z) with the actual instance node 143. The output of the relationship generator is the graph stage $G_1$ 97.

Figure 10:
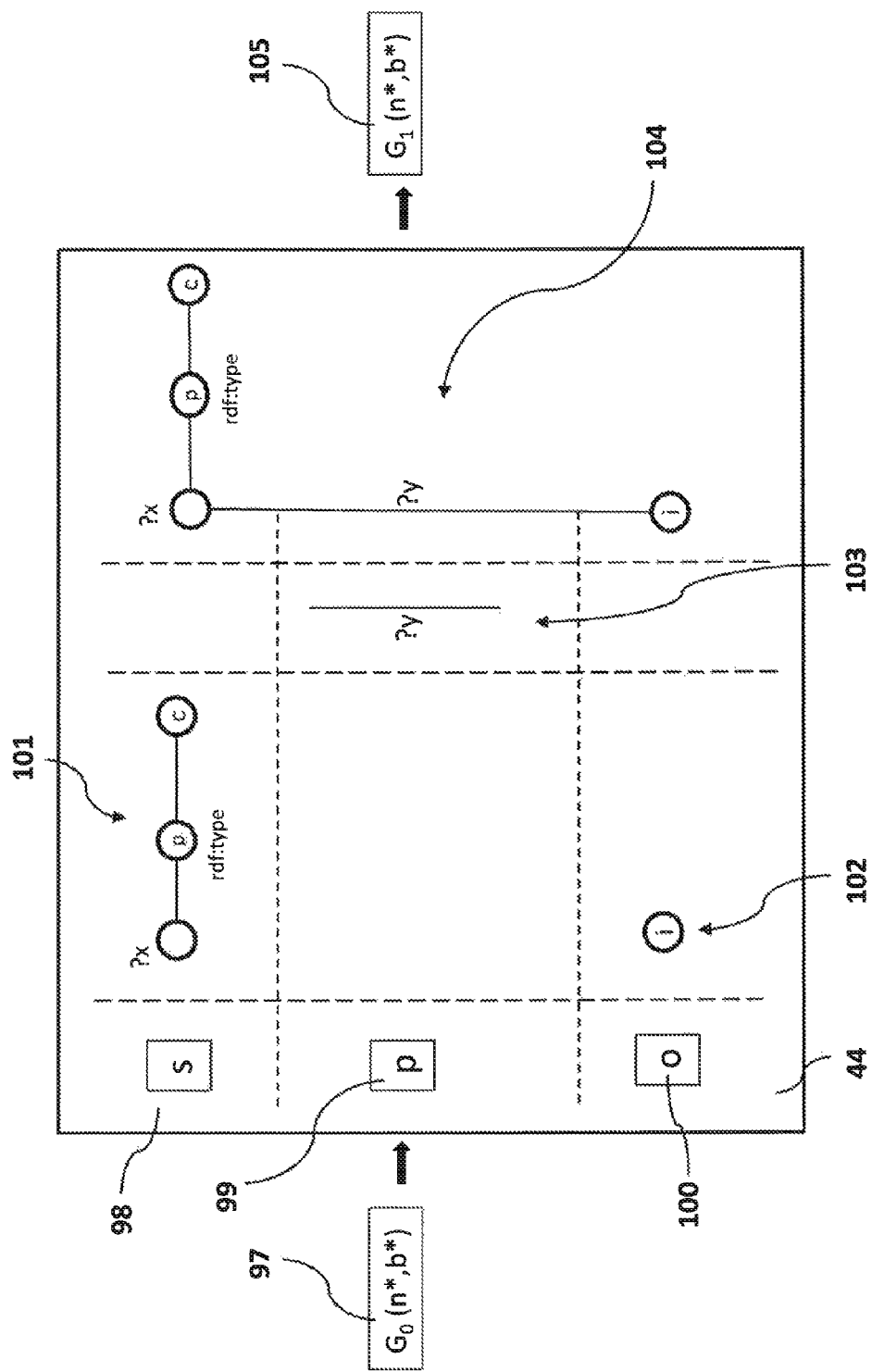
FIG. 10 is a more detailed chart of the pattern employment of the relationship.

FIG. 10 provides another view of the functioning of the relationship generator. After receiving the graph $G_0$ 90 generated by the node generator, the relationship generator aims at generating triples of the form subject-predicate-object (98, 99, 100). Each pattern provides a set of elements that are compared to $G_0$ (101, 102), as well as one or multiple elements that are newly added (103). FIG. 10 shows a simple example, where a variable and an instance node are connected with an undefined branch ?y (104).

Figure 11:
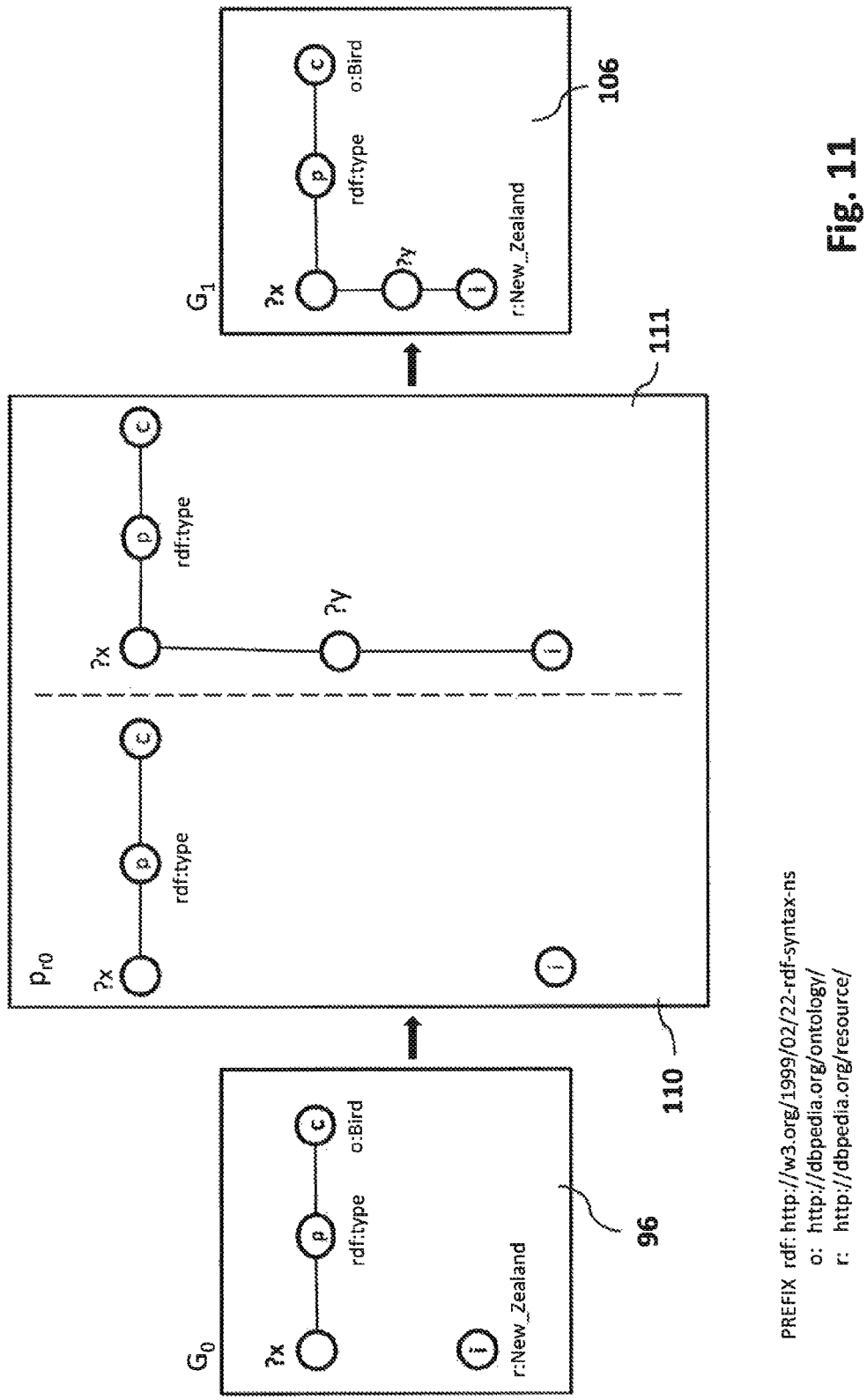
FIG. 11 illustrates the basic operating principle of the relationship generator, by means of the employment of a relationship pattern.

The employment of a simple relationship pattern $p_{r0}$ is shown in FIG. 11. The relationship generator receives $G_0$ 96 and employs a pattern which connects a non-terminal node of a specific class and an instance (110) node with a non-terminal branch (111). The output of the relation generator is the second stage of the semantic graph $G_1$ 106.

Figure 12:
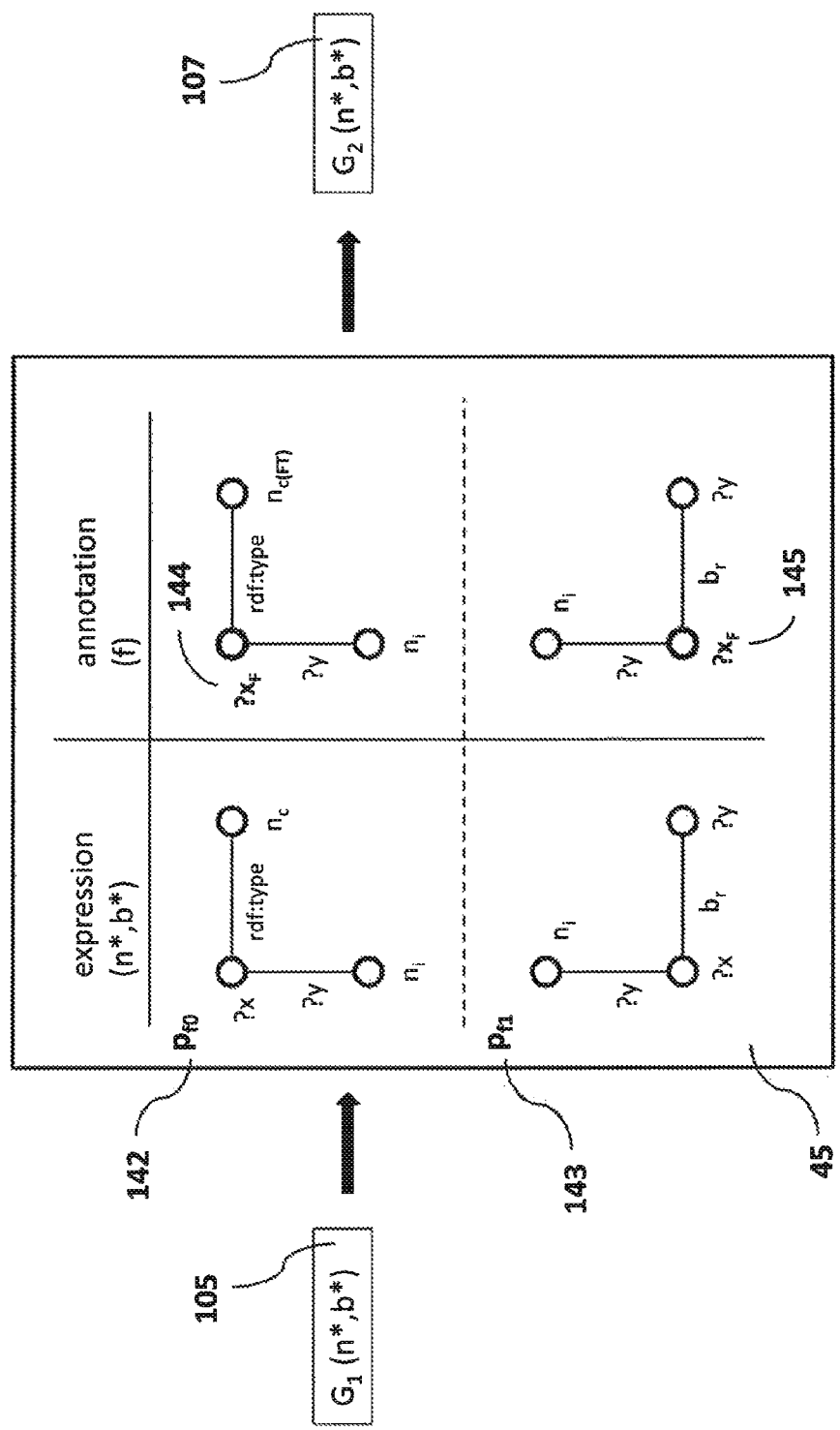
FIG. 12 illustrates the basic operation of the focus generator, by means of some sample focus patterns

Focus generator 45 is the third element of the semantic interpreter. Its primary task is to identify the focus (of the query) among more than one non-terminal nodes and non-terminal relations using focus patterns. FIG. 12 shows two simple focus patterns $p_{f0}$, $p_{f1}$ (142, 143) identifying a non-terminal element as the graph's focus (144, 145) (The annotation indicates the focus $?x_F$, wherein "F" designates the focus).

Figure 13:
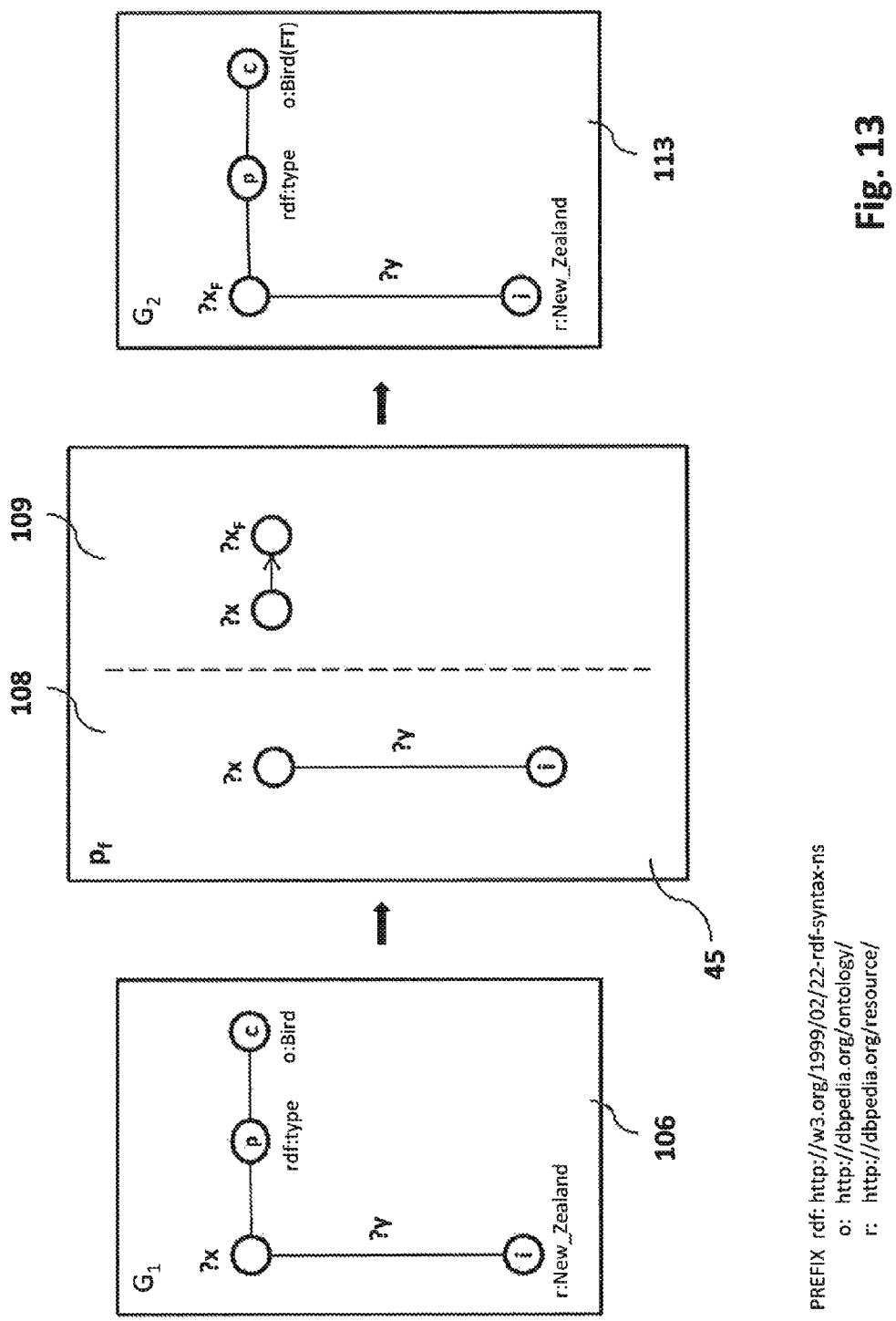
FIG. 13 shows the employment of a focus pattern by the focus generator.

The employment of a focus pattern is depicted in FIG. 13. The focus generator receives a graph $G_1$ 106 computed by the relation generator, identifies the most probable focus pattern with respect to $G_1$ and identifies a non-terminal element as the graph's focus. In FIG. 13, the pattern's expression 108 consists of a non-terminal node connected by a non-terminal branch with an instance token, where the annotation 109 identifies the non-terminal node as the query's focus. Employing this pattern on the input graph $G_1$, the focus generator associates the appropriate elements of the graph with elements of the pattern expression, identifying the non-terminal node ?x as the graph's focus. As mentioned above, if a non-terminal node that is connected to a single class node is selected as a focus, the corresponding class node is identified as the query's focus type, indicating the type of entities the query searches for. In this example, the focus pattern not only designates the focus $?x_F$, but also indicates that class c is the query's focus type FT. This is reflected in the output 113 of the focus generator, wherein the class node with the URI ontology: $Bird_{FT}$ is determined as the focus type indicator FT.

Figure 14:
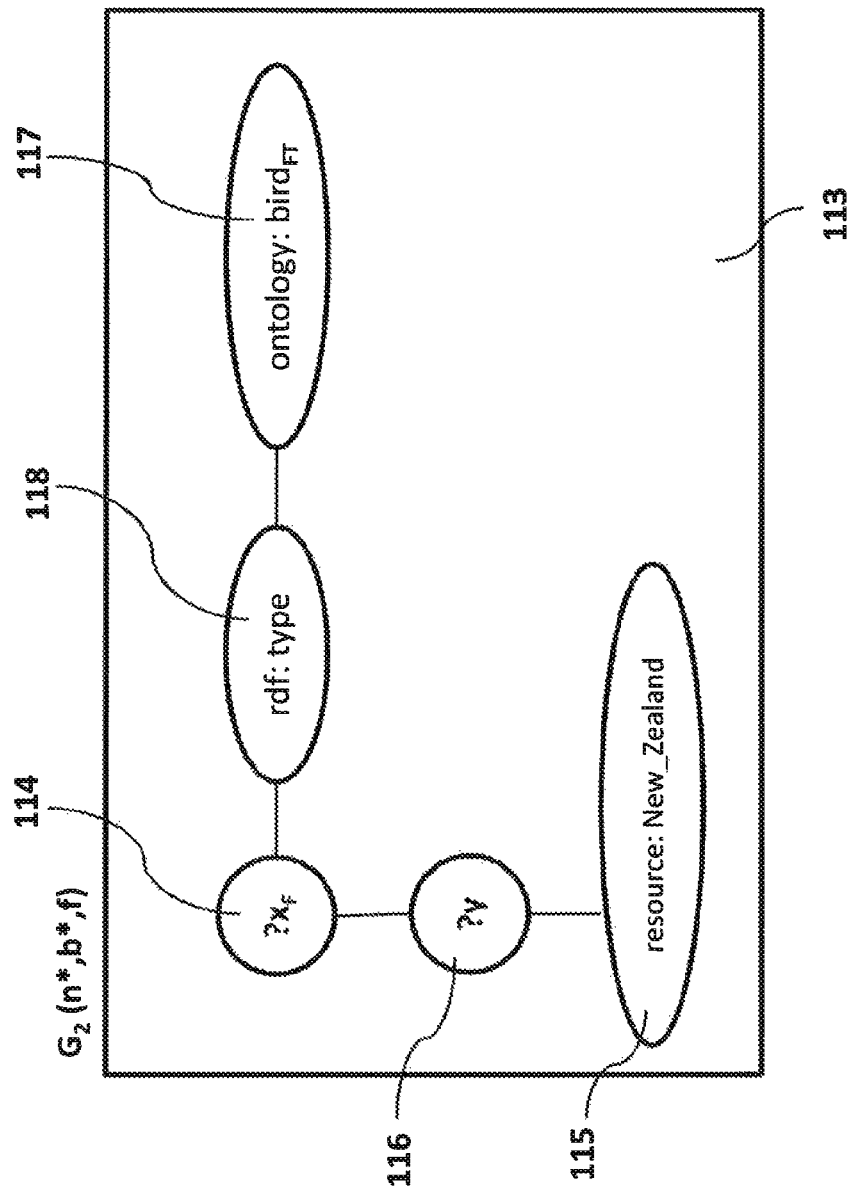
FIG. 14 depicts a sample labeled graph generated by the parser, FIG. 15 provides an overview of the graph generation of a sample query.

An example of an output of the focus generator, the graph stage $G_2$ consisting of a set of nodes, branches and a focus, is shown in FIG. 14. The graph 113 contains all the necessary elements to produce a search query. Element 114 is a non-terminal node which is also the query's focus. It represents one or multiple entities, characterized to be instances of a specific class (here: "birds") 117, which also represent the query's focus type, indicated by the branch 118. 115 is an instance, namely "New Zealand". Elements 114 and 115 are connected through a non-terminal relation ?y 116.

As mentioned earlier, the generated graph can also be expressed using a triple-based annotation, which is the base for the intermediate query representation that is transmitted to the query performer. For example, the graph in FIG. 14 can simply be re-written in the following triple-based notation:

$$\begin{bmatrix} ?x_F & rdf\text{:type} & ontology.Bird_{FT} \\ ?x_F & ?y & resource\text{:New\_Zealand} \end{bmatrix}.$$

Figure 15:
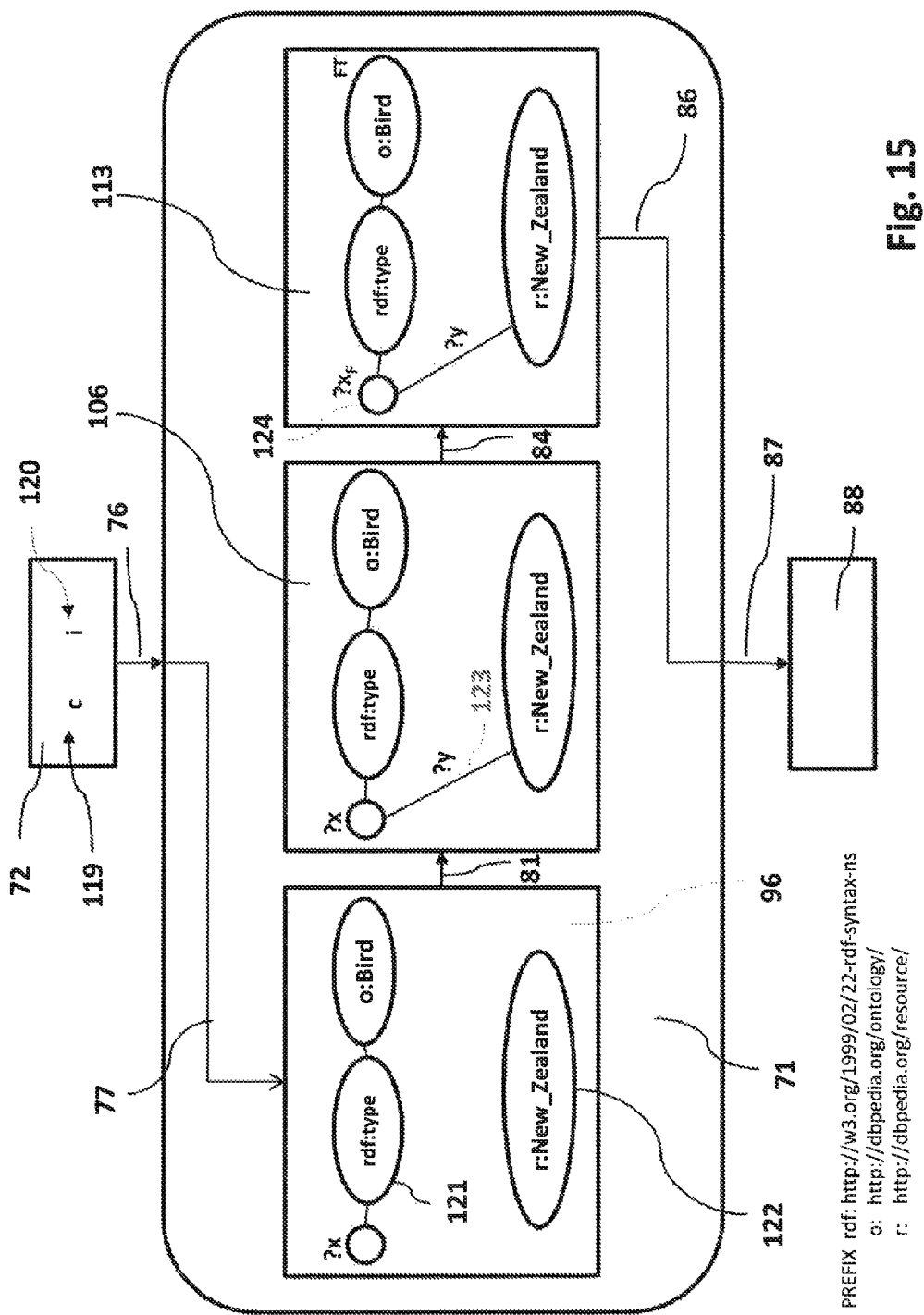

The whole process performed by the semantic interpreter i.e. the node generator, the relationship generator and the focus generator for the above example of "birds of new zealand" is schematically shown in FIG. 15, which is a representation of FIG. 6 with a concrete example. The same reference numerals have been used for like elements.

The tokenizer has identified a class token, "bird", and an instance token, "new zealand". These tokens are shown as "c" (reference numeral 119) and "i" (reference numeral 120). The node generator transforms these into elements 121 (non-terminal node ?x, rdf:type relation and terminal class node "c") and 122 (terminal instance node "i"), resulting the graph $G_0$ 96. The relationship generator complements non-terminal relation ?y (reference numeral 123) and thus computes $G_1$ 106. The focus generator finally selects non-terminal node 124 as the query's focus $?x_F$, the final semantic graph is computed in $G_2$ 113.

Figure 16:
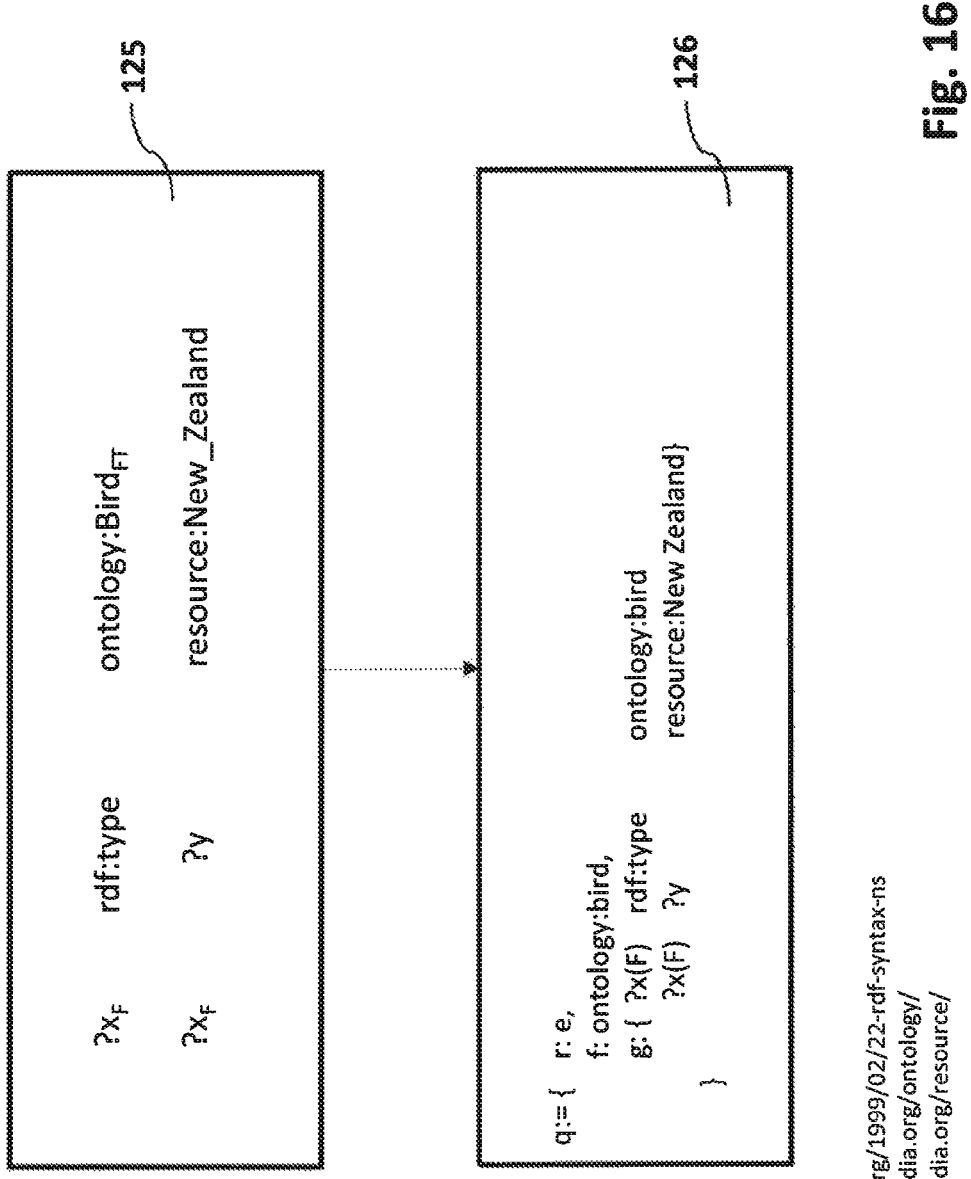
FIG. 16 shows a sample semantic graph in triple notation and the corresponding intermediate query representation of the graph.
Figure 17:
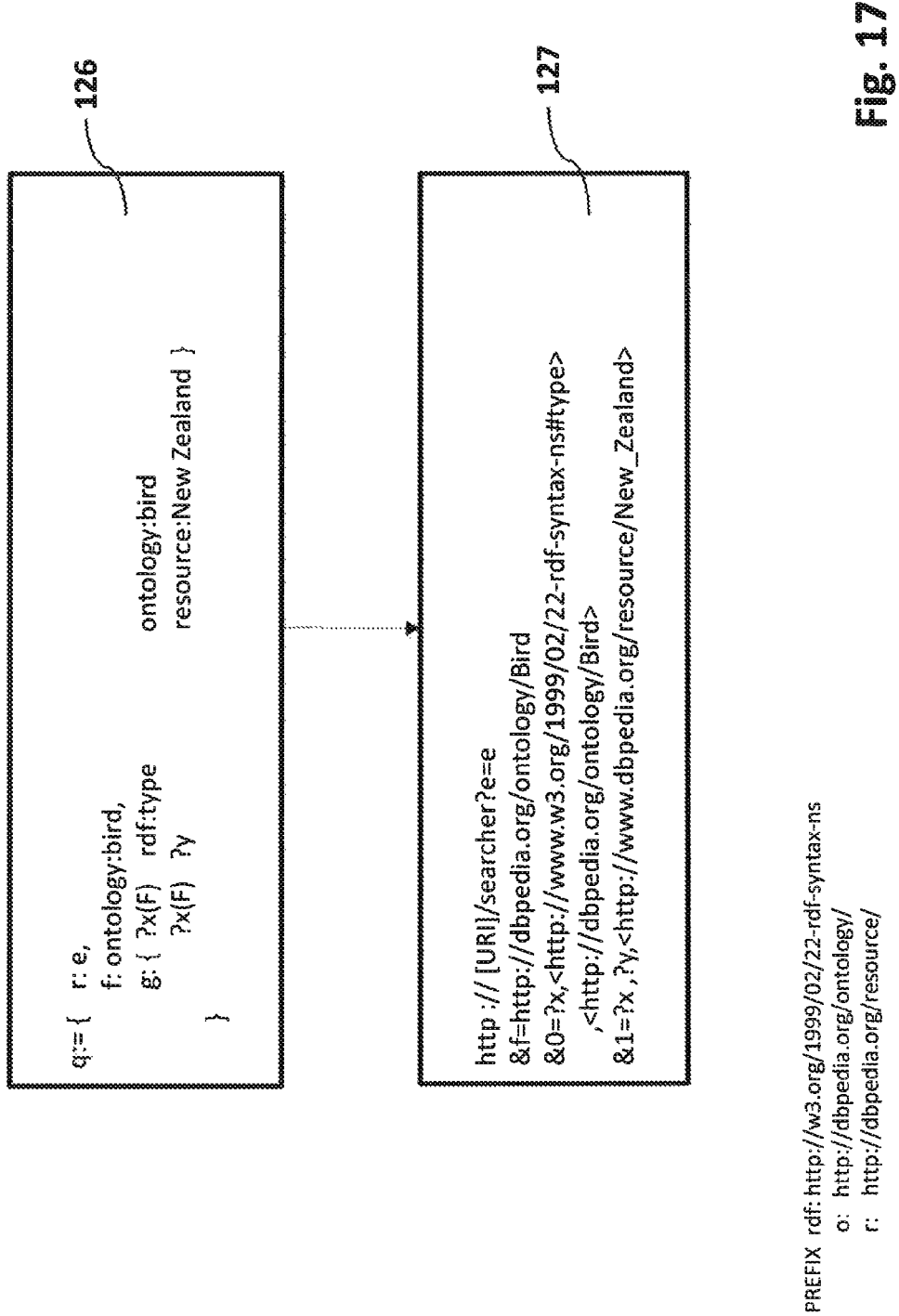
FIG. 17 shows a sample intermediate query representation and a corresponding HTTP request to a data module by the query performer.

FIG. 16 depicts symbolically the output of the parser. The graph-based representation generated by the parser can be depicted in triple-based notation 125, which can be transformed into an intermediate query representation which can, for example, look like the one in box 126. Additionally to the query triples, this intermediate representation contains data about the query's request type (r), which searches for entities (e) in this case, and the query's focus type (f) (here: "birds"). This intermediate query is advanced to the data modules 27 and/or 28, which select the web resource (knowledge database 32, 33) to be used. In the present case, the query performer is likely to select a general-purpose knowledge source such as DBpedia, while data sources which contain geospatial data or local business data would be considered less relevant for answering the query—so computer and connection time can be saved by using only DBpedia for this particular query. The intermediate query representation has then to be translated into the particular query language of the chosen knowledge database, e.g. SQL or SPARQL (the query language can be different from one knowledge database to another). This translation is performed by data modules 27 and/or 28, where each data module is associated and specified for one particular database. FIG. 17 depicts a practical example of how intermediate query representation 126, could be transmitted via HTTP to a data module with the query triples encoded as alphanumeric parameters 127.

Figure 18:
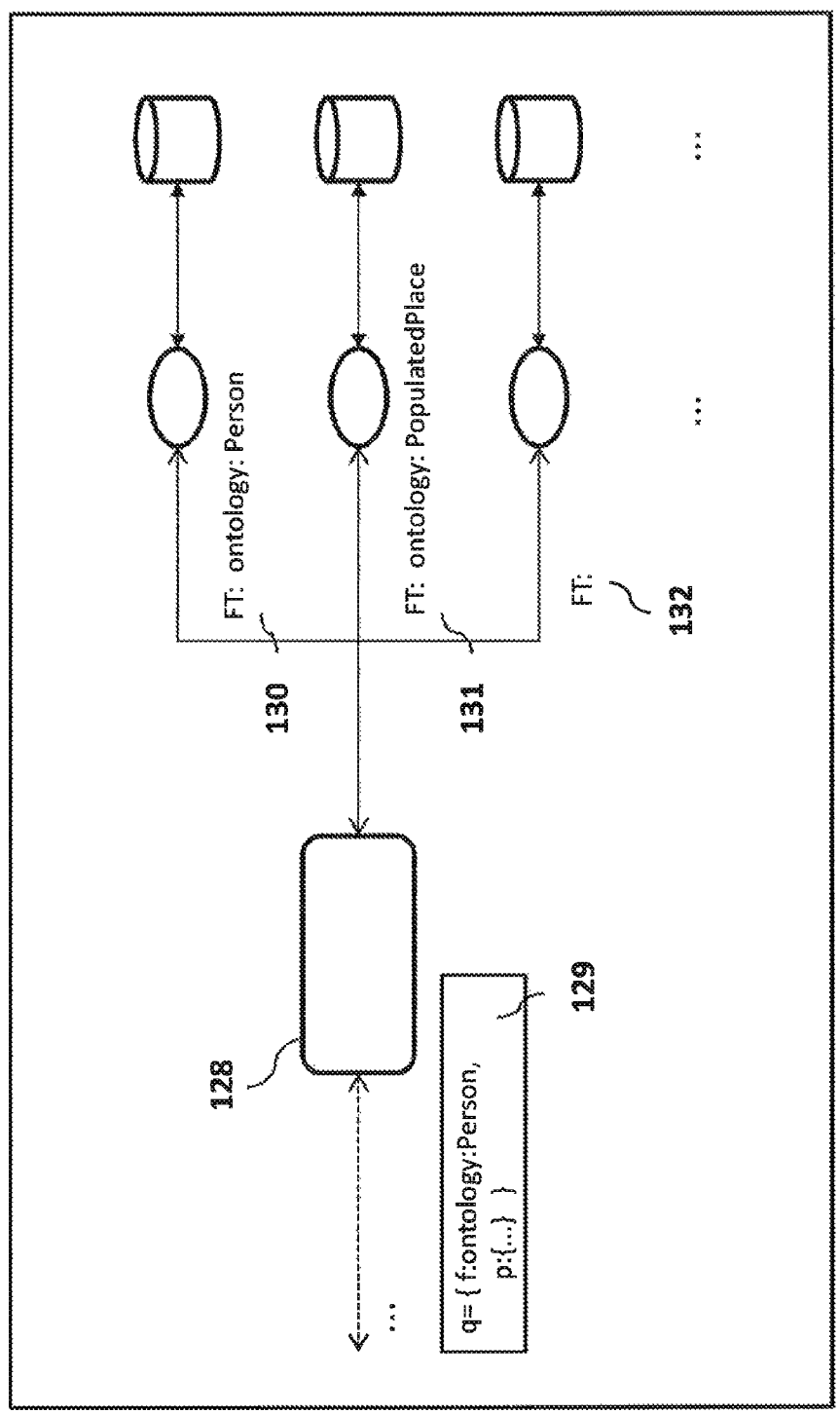
FIG. 18 shows the possible identification of relevant knowledge sources for retrieving search results

FIG. 18 shows a possible identification of relevant knowledge sources by the query performer 128 for a query by associating each knowledge source with one, multiple or no identifiers indicating their domain(s). As described above, the focus identifier may eventually indicate a class node connected with the focus elements as the graph's focus type 129. This identifier depicts the kind of entities the query searches for. To select relevant data sources, the query performer compares the identifiers registered as a knowledge source's domain (130,131,132) with the identifier determined as a query's focus type. In the given example, the query searches for natural persons, thus the query performer would consult the knowledge sources 130 and 132, while a geospatial database 131 would be considered less relevant for a query concerning a natural person. As no special identifier is registered for 132, the knowledge source is consulted independently from the query's focus type.

Figure 19:
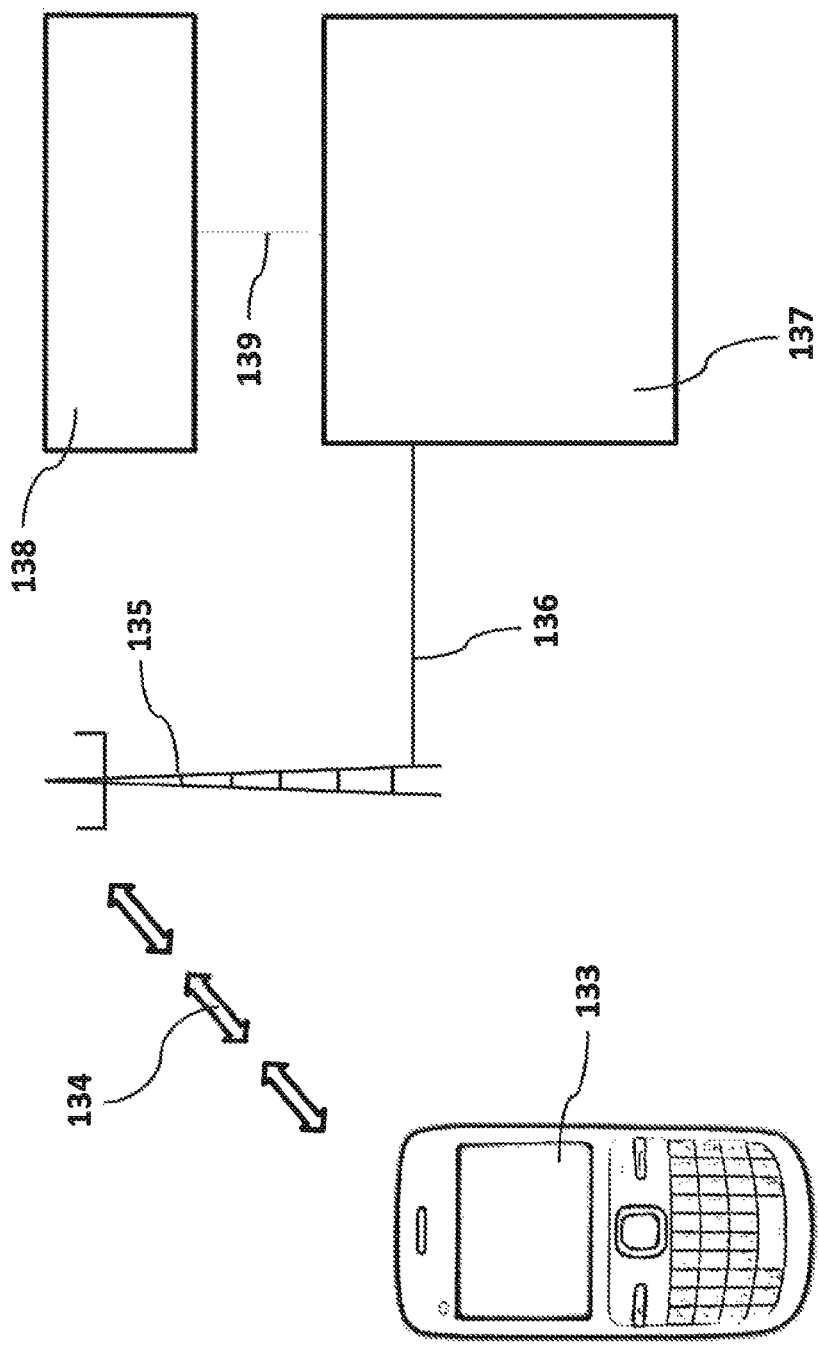
FIG. 19 is an overall diagram illustrating the use of a natural language search engine according to the present invention in a client-server structure.

FIG. 19 depicts schematically how the present invention can be used in a mobile environment. A mobile phone such as a smartphone 133 is operated as a client. This is easily possible, since in a client/server configuration, the user interface needs little computing power and can even be run on small or not very powerful devices. What is even more important, there is not much traffic between the client and the server—the client just needs to send the search query and receive a short list of tailored results, which makes the invention ideally suited for wireless connections, even with low bandwidth. In the embodiment of FIG. 19, smartphone 133 communicates via bidirectional wireless communication link 134 with antenna 135, which is in turn connected through landline 136 (e.g., a cable or optical fiber connection) with a server 137. It will be noted that most traffic between the natural language search engine and the Internet 138, such as communication with knowledge databases, will thus happen over fast landline 139 and not via the wireless connection 134. However, it has to be pointed out that the invention is not limited to a client/server environment.

The invention claimed is:

1. Method, in particular computer-implemented method or method implemented by digital electronic components, for retrieving results in response to a query, in particular a user-defined natural language query, from semantically structured resources stored in at least one database, comprising the steps of:
   i. tokenizing the query by segmenting the query into terms, in particular one or multiple words, and mapping them into semantic tokens using at least one lexicon, wherein such lexicon contains at least the token type of a semantic token, in particular class, role, instance and/or constraint,
   ii. generating a representation, in particular a representation Incorporating a mathematical graph, of the semantic tokens associated with the segmentation performed in step (i), and determining the representation's focus, by employing a set of rules or patterns for such focus based on the token type, in particular class, role, instance and/or constraint, of the semantic tokens, wherein the rules or patterns define one or more nodes, and/or one or more relationships between nodes, associated with the token type of the semantic tokens, and the rules or patterns distinguish between terminal and non-terminal nodes and relationships, and characterize one of the non-terminal nodes or relationships as the query's focus, iii. generating a database query, in particular an SQL, SPARQL or XQuery query, from the graph-based intermediate representation determined in steps i) and ii) and sending it to the at least one database, iv. retrieving a response from the at least one database.

2. Method according to claim 1, wherein the step of tokenizing the query includes the steps of
a) segmenting the query into terms, in particular one or multiple words,
b) mapping the terms into semantic tokens using at least one lexicon, wherein such lexicon contains at least the token type of a token, in particular class, role, instance and/or constraint,
c) calculating the probability that such segmentation is appropriate,
d) repeating steps a) to c) at least one more time for a different segmentation,
e) comparing the probabilities of different said segmentations and selecting a segmentation with a high probability, in particular the segmentation with the highest probability,
f) performing step ii) of claim 1 based on the selected segmentation.

3. Method according to claim 2, wherein said lexicon contains a relevance factor for said semantic token and the step of calculating the probability that a particular segmentation is appropriate is based on such relevance factor.

4. Method according to claim 1, wherein step ii) includes:
a) employing a set of rules or patterns with a specific token type, in particular a class, instance, role or constraint for each semantic token,
wherein each said rule or pattern defines one or more said nodes, and/or one or more said relationships, associated with the token type of such semantic token,
b) computing further relationships between the nodes and/or relationships to complete the mathematical graph,
c) selecting one of the non-terminal nodes or non-terminal relations as a focus, in particular based on a comparison between the similarity of the mathematical graph and the semantic tokens in the segmentation and/or a truth value associated with the further relationship between the node and/or the relationship.

5. Computer program product, in particular computer-readable medium, particularly a compact disk or the memory or the hard disk of a digital computer, that can at least partially be loaded into the internal memory of the digital computer, in particular a server, that includes instructions for executing the steps according to claim 1 when executed on the digital computer.

6. Apparatus for performing natural language searches comprising:
i. at least one user input interface for entering user queries,
ii. a digital processor directly or indirectly connected with said user input interface, and further directly or indirectly connected with instruction/data storage means including:
a) a tokenizer memory containing instructions and/or data for tokenizing such user-entered queries from terms into semantic tokens, wherein such tokenizer is connected with at least one lexicon,
b) a node/relationship memory containing second instructions and/or data, in particular node pattern data, for generating nodes and/or relationships for semantic tokens with a predefined token type,
c) a relationship memory containing third instructions and/or data, in particular relationship pattern data, for generating further relationships between the nodes,
d) a focus memory containing fourth instructions and/or data, in particular focus pattern data, for selecting a non-terminal node,
e) a query memory containing fifth instructions and/or data for generating a database query and sending it to at least one database operatively connected with the digital processor,
f) a results memory containing sixth instructions and/or data for processing responses from the at least one database,
iii. at least one user output interface directly or indirectly connected with said digital processor for displaying, indicating or storing the received results.

* * * * *